United States Patent
Agarwal et al.

(10) Patent No.: US 12,386,810 B1
(45) Date of Patent: Aug. 12, 2025

(54) CUSTOM INDEXED TAGS

(71) Applicant: SPLUNK Inc., San Francisco, CA (US)

(72) Inventors: Umang Agarwal, Menlo Park, CA (US); Akila Balasubramanian, Campbell, CA (US); Henry Maier, San Francisco, CA (US); Viet Quoc Nguyen, Oakland, CA (US); Donald Passey, Gilbert, AZ (US); Vladimir Sor, Tartu (EE); Timothy Matthew Robin Williamson, Santa Barbara, CA (US); Eric Allen Wohlstadter, Menlo Park, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 18/611,555

(22) Filed: Mar. 20, 2024

(51) Int. Cl.
  *G06F 7/00* (2006.01)
  *G06F 16/22* (2019.01)
  *G06Q 10/067* (2023.01)

(52) U.S. Cl.
  CPC ....... *G06F 16/2291* (2019.01); *G06Q 10/067* (2013.01)

(58) Field of Classification Search
  CPC .... G06F 16/2291; G06F 16/907; G06F 16/14; G06F 16/951; G06F 16/00; G06F 16/221; G06F 16/245; G06F 16/211; G06F 16/252; G06F 16/958; G06F 40/117; G06Q 10/067; G06Q 30/0601; G06Q 30/06; G06Q 30/04; G06Q 30/02; G06Q 30/10
  See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,104,666 B2* | 8/2015 | Goyal | G06F 21/6218 |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2008/0270538 A1* | 10/2008 | Garg | H04L 67/55 |
| | | | 705/26.1 |
| 2011/0093461 A1* | 4/2011 | Mui | G06F 16/958 |
| | | | 707/E17.001 |

(Continued)

OTHER PUBLICATIONS

Splunk Enterprise 8.0.0 Overview, available online, retrieved May 20, 2020 from docs.splunk.com.

(Continued)

*Primary Examiner* — Mohammad A Sana
(74) *Attorney, Agent, or Firm* — Kilpatrick Townsend & Stockton LLP

(57) ABSTRACT

An observability system is disclosed that provides novel techniques for configuring indexable custom tags. The observability system enables customers and users to specify and create indexable custom tags in a flexible and user-friendly manner. The observability system includes a novel custom tag configuration system that enables users of the observability system to configure indexed custom tags. Using a set of user interfaces (e.g., graphical user interfaces (GUIs)), a user is guided through a workflow for configuring indexed custom tags.

17 Claims, 14 Drawing Sheets

(56) References Cited

U.S. PATENT DOCUMENTS

| | | | | |
|---|---|---|---|---|
| 2012/0304247 A1* | 11/2012 | Badger | ............... | G06F 21/6218 |
| | | | | 726/1 |
| 2015/0302052 A1* | 10/2015 | Galarneau | ............... | G06F 40/14 |
| | | | | 707/736 |
| 2019/0098106 A1 | 3/2019 | Mungel et al. | | |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Splunk "Anylyze Service Performance with Tag Spotlight" pulled from the Internet on Mar. 20, 2024: https://docs.splunk.com/observability/en/apm/span-tags/tag-spotlight.html, 4 pages.

Splunk "Generate a Monitoring MetricSet with a Custom Dimension" pulled from the Internet on Mar. 20, 2024: https://docs.splunk.com/observability/en/apm/span-tags/cmms.html#cmms, 11 pages.

Splunk "How to Use Tags to Speed Up Troubleshooting" pulled from the Internet on Mar. 20, 2024:https://www.splunk.com/en_us/blog/devops/how-to-use-tags-to-speed-up-troubleshooting.html, Nov. 9, 2023, 11 pages.

Splunk "Index Span Tags to Generate Troubleshooting MetricSets" pulled from the Internet on Mar. 20, 2024: https://docs.splunk.com/observability/en/apm/span-tags/index-tag-tips.html, 8 pages.

Splunk "Learn about MetricSets in APM" pulled from the Internet on Mar. 20, 2024: https://docs.splunk.com/observability/en/apm/span-tags/metricsets.html#apm-metricsets, 6 pages.

Splunk "References and Best Practices for Span Tags and Troubleshooting MetricSets" pulled from the Internet on Mar. 20, 2024: https://docs.splunk.com/observability/en/apm/span-tags/index-tag-tips.html, 8 pages.

Splunk "References and Best Practices for Span Tags and Troubleshooting MetricSets" pulled from the Internet on Mar. 20, 2024: https://docs.splunk.com/observability/en/apm/span-tags/index-tag-tips.html#apm-default-span-tags, 8 pages.

* cited by examiner

CUSTOM INDEXED TAGS

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

For developers of software applications, the ability to monitor application performance and user experience is very important for the success of the application. This includes the ability to monitor different ways in which users interact with the applications and the application's performance in response to the user interactions. For example, when a user selects a URL on a website, the provider of the website would like to monitor the time taken for the website to be loaded and displayed to the user. As another example, when the user using a mobile device executes a buy transaction, it may be useful for the provider of the application to monitor how fast different aspects of the transaction are executed. Performance of the application may be measured on the basis of disk utilization of the application, CPU utilization of the application, errors encountered during execution of the application, significant events encountered during execution of the application, information describing which parts of code are being executed and which parts are not being executed, among others.

Observability systems enable application developers to monitor applications, receive data from the monitoring, and analyze the received data. To enable data monitoring and collection of data, such as user interaction data, the applications, and the devices executing the applications are instrumented to enable monitoring and collection of the data. For example, the applications and the devices may be instrumented using data collectors or agents, such as agents provided by the OpenTelemetry (OTel) observability system.

A common problem faced by all observability systems is that the amount of data being collected is large, which makes analysis of the data difficult, especially analysis that may need to be customized for individual customers. Providers of observability platforms are therefore always looking for improved ways to analyze the collected data in ways that best suit customers' needs.

DETAILED DESCRIPTION

Figure 1:
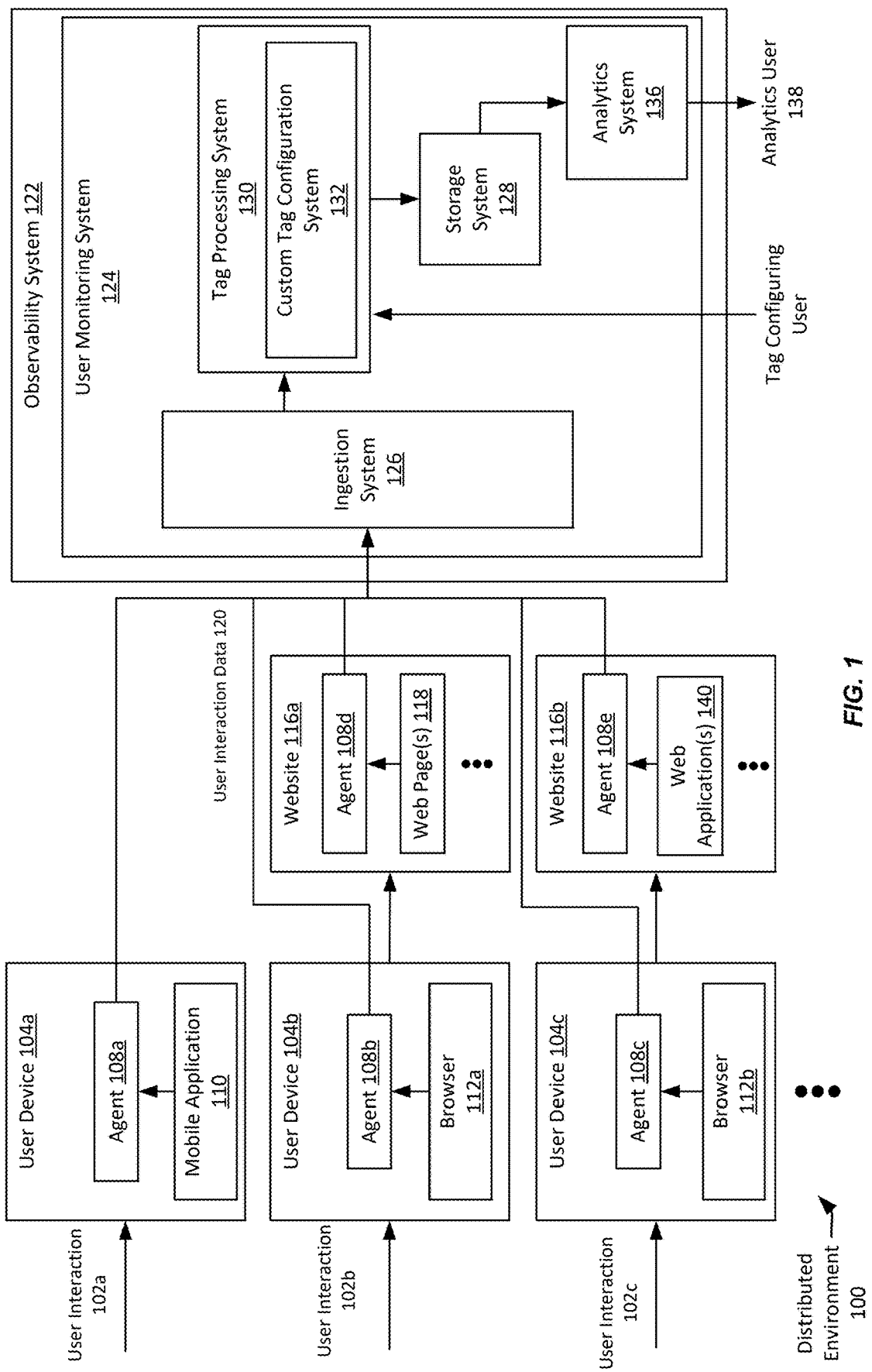
FIG. 1 illustrates an example distributed environment incorporating an observability system according to certain embodiments.

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order not to obscure the implementation being described.

The present disclosure relates to techniques for monitoring user interactions with applications such as mobile applications, web applications, and web pages. More particularly, an observability system is described that provides novel techniques for configuring indexable custom tags that enable more flexible and user-customized monitoring and analysis of data (e.g., data related to user interactions with one or more applications and the applications' performance in response to the user interactions) received and analyzed by the observability system.

An observability system may be configured to monitor and collect data related to user interactions with applications and the applications' performance, analyze the data, and provide the analysis results to providers of the applications, where the analysis data enables the providers to monitor the performance of the applications. For example, based on analysis results provided by the observability system, a provider (e.g., a Systems Reliability Engineer responsible for application performance) can monitor the performance of the application and identify any performance issues (e.g., responsiveness of the application, errors, or faults).

In certain implementations, an observability system is provided that uses distributed tracing is used to monitor user interactions with applications including how a user request resulting from a user interaction moves from a user device to the front end of the application and then to the application backend where the request may be handled by one or more microservices. A microservice may be implemented using multi-layered stacks made up of servers, application code, containers, orchestrators, etc. Distributed tracing enables tracking of the user requests or transactions through an application being monitored.

Distributed tracing is generally initiated when a user interacts with an application (e.g., web page of a web application) and initiates a user request. For example, a user may access a retailer website and add an item to be purchased to a shopping cart. This user request or transaction then is communicated from the application front end (which may be executing on a user device) to the application back end where one or more operations may be performed to handle the user request. A transaction may be represented by a collection of operations. A transaction may describe an end-to-end request-response flow, from the making of a user's initial request to receiving a final response. A transaction may involve the interaction of multiple services.

A trace may represent a user interaction with the application, typically via the application front end. A user request received via the user interactions then moves through the front end of the application to the back end where it may be handled by one or more servers or microservices. One trace may represent one user interaction. A trace may follow the course of a request or transaction from its source to its ultimate destination in the application back end. A trace may represent how requests move from users and frontend devices to backend services and databases. A trace may include information about the interaction as well as causality. A trace may be identified using a trace identifier (trace ID), where the trace ID correlates with the trace of a specific user interaction. A trace is also characterized by a beginning time, and an end time.

One or multiple operations may be performed by the application in response to a user request or interaction. As a user request corresponding to a trace moves through the application back end, every operation performed by the application in handling the user request may be tagged. Each such operation is referred to as a span. Accordingly, a trace corresponding to a user interaction may result in and be made up of one or more spans. Each span may represent a segment of a trace. A span may include information related to a service performing the operation represented by the span. A span may also include a unique span ID, a service name (e.g., "analytics"), an operation name (e.g., "start"), a duration (latency), a start timestamp, an end timestamp, and additional annotations and attributes. The annotations and attributes can describe and contextualize the work being done under a span. The data collected by an observability system is generally in the form of spans and traces data.

In certain implementations, an observability system may be configured to perform remote user monitoring (RUM). The data collected by an observability system for RUM analysis may include data related to user interactions with an application being monitored, and how the application, including the application frontend and the application backend, handles the user requests resulting from the user interactions. The application backend may be implemented using one or more servers, one or more microservices, and the like. Remote user monitoring may be used to identify front end application performance characteristics (e.g., crashes, latency, operating system, etc.). RUM analysis may be used by a developer of the front end application to monitor the performance of the front end application. The developer may perform bug fixes, enhancements, etc. for the application in response to the monitored performance characteristics. An observability system that receives the spans data and traces data for the RUM system needs improved analysis techniques for analyzing the data in a way that is customized and meaningful to individual customers who may be application developers. Since the RUM may receive large amounts of front end user interaction data, techniques for filtering the data are useful.

An observability system may provide tags to enable filtering and grouping of the data received by the observability system. As indicated above, the data received by the observability system may include larger volumes of user interaction data that may include spans data and traces data. A tag may be characterized by one or more key-value pairs.

A tag can be used to filter data received by an observability system. An observability system typically may receive a large volume of data for a customer and tags can be used to filter and group the data for data that is relevant for the customer. For a particular tag, the observability system is configured to identify a subset of data that meets the tag criteria (e.g., the key-value pairs specified for the tag).

Analytics may then be performed by the observability system on the tag-filtered data. For example, a tag named "OS-MS-Apple" may be defined by two key-values pairs: {OS=Windows; OS=iOS}. For such a tag, the observability system is configured to identify those datapoints, from the datapoints received by the observability system, where the OS field of the datapoints is set to Windows or iOS. The other datapoints may be filtered out. A tag thus allows the observability system to filter and identify data that satisfies the tag criteria. The observability system may then perform additional analytics on the filtered data. Tags thus provide a convenient way for the observability system to identify and group data that is relevant for further analysis, generally data that is relevant to a provider of an application whose performance is being monitored by the observability system.

The tag may include more complicated key-value pairs. For example, the tag may filter/group user interaction data based on more than one key and one or more values for each key (e.g., ((Browser=Chrome OR Firefox) && (OS=Windows)). In the example just described, the user interaction data may be grouped such that user interaction data associated with user devices running either Chrome or Firefox on a Windows operating system are grouped. Many combinations may be implemented using key-value pairings.

In another example, a key-value pair defined by a tag may be: "Browser=All." In this case, the tag would cause each user interaction data datapoint including a browser to be included in the grouping created through the use of the tag. The user interaction data analyzed using the tag may be from a particular time period (e.g., past 1 minute, past 10 minutes, past hour, past day).

In certain implementations, an observability system may provide two types of tags: (a) default tags, and (b) custom tags. A default tag is a type of tag that is provided by the observability system out of the box. The observability system may also allow customers and users (e.g., developers) to define their own tags, beyond the default tags provided by the observability system. These tags that are configurable and customizable by a user or customer of the observability system are referred to as custom tags. A customer or user may define a custom tag for data that is relevant to that customer and user. For example, a customer may define a custom tag to monitor specific characteristics of the front end that may be useful for obtaining insights into the user interactions. Customers or users may define custom tags to facilitate analysis of data that is relevant for them. Customizable tags add enhanced analytics capability to the observability system that is customized for the customer or user.

A custom tag, like any other tag, may be defined or characterized by one or more key-value pairs. For a custom tag, both the keys and their corresponding values can be specified by the user or customer of the observability system. This is different from a default tag, where the one or more key-value pairs associated with a default tag are specified by a provider of the observability system.

A tag may be indexed (indexable) or unindexed (unindexable). For a tag that is indexed, the observability system is configured to automatically compute a set of metrics for the tag. These metrics may include, for example, statistical measures such as percentile metrics, quantiles, maximum and minimum values, etc. A set of metrics may thus be specified for the tag, and if the tag is indexed, the observability system is configured to compute the set of metrics for each key-value pair that defines the tag. For example, assume an observability system is configured to compute three metrics M1, M2, and M3 for each indexed tag. Further assume, that a "Tag1" is defined for the observability system with key-value pairs {(key=value1); (key=value2)}. The observability system is configured to first identify datapoints that satisfy the Tag1 criteria (i.e., datapoints that have a field "key" with values "value1" or "value2"). The observability system is then configured to compute three metric values for M1, M2, and M3 for the datapoints where (key=value1), and further three metric values for M1, M2, M3 for the datapoints where (key=value2). As a result, six total metric values are computed for Tag1. These metric values may be computed by the observability system on an ongoing periodic basis.

In the above example, the six metric values that are computed for Tag1 represents the cardinality value for Tag1. In general, the cardinality for a tag is represented by the number of values associated with the tag multiplied by the number of metrics configured for an index tag. In the above example:

The number of values associated with tag Tag1=2 (values: value1 and value2)

Number of metrics=3 (M1, M2, and M3)

Cardinality of Tag1=2*3=6 (i.e., the number of metric values computed for the tag)

The computation of metric values for a tag requires a certain amount or number of observability system resources, including processing, memory, and networking resources. The amount or number of resources required for an indexed tag is typically directly proportional to the cardinality of the tag. Accordingly, the amount or number of resources that are needed increases with the cardinality of the tag.

As a result, in the past, only default tags were indexed. This is because, since a default tag is preconfigured by the provider of the observability system, the values associated with a default tag and the number of metric values computed for the tag are under the control of the observability system provider. As a result, the amount or number of resources required for a default tag is also under the control of and known by the observability system provider.

Accordingly, in the past, custom tags were not indexed by observability systems. While the observability system was capable of filtering and grouping data using custom tags, metric values were not computed for the custom tags. For a custom tag, the observability system showed the user the data that satisfied the custom tag (e.g., the traces and spans that satisfied the custom tag criteria), but metrics values were not automatically computed. While some observability systems did provide some indexing on custom tags, this had to be set up using backend negotiations and consultations between the users or customers and the engineers of the observability system. This is very inconvenient for the users and customers of the observability system and not scalable.

The present disclosure describes an observability system that enables customers and users to specify and create indexable custom tags in a flexible, scalable, and user-friendly manner. In certain implementations, the observability system includes a novel custom tag configuration system that enables users of the observability system to configure indexed custom tags. Using a set of user interfaces (e.g., graphical user interfaces (GUIs)), a user is guided through a workflow for configuring indexed custom tags.

In certain implementations, via GUIs provided by the observability system, a customer (e.g., a user associated with a customer) can input one or more key-value pairs to be associated with a custom tag to be created for the customer. The customer can also, via the GUIs, input a set of metrics to be computed for the custom tag being created. The observability system then performs processing to determine if the indexed custom tag being configured can be created for the customer. As part of this processing, the observability system determines a cardinality for the tag being configured. The observability system then determines if there are sufficient resources available to the customer for supporting the tag being configured. If the observability system determines that sufficient resources are not available for the customer, then the customer is provided, via a set of GUIs, to reduce the cardinality of the tag being configured. For example, GUIs are provided to the customer to reduce the number of values associated with the tag and/or to reduce the number of metrics for the tag being configured. Alternatively, the customer is also allowed to buy more resources to support the tag being configured. In this manner, the observability system provides a flexible, easy-to-use use, and automated workflow for configuring indexed (or indexable) custom tags.

The various techniques for indexable custom tags described herein provide several technical advantages and applications. The observability system performs processing to determine whether a custom tag can be made indexable or not. This includes determining a number or amount of computing resources (including processing, memory, and network resources) needed to support the tag, and further determining whether the customer has sufficient resources. If not, various options are provided to the customer via GUIs to make the tag indexable. This includes options for reducing the cardinality of the tag by reducing the number of values associated with the tag and/or by reducing the number of metrics for the tags, and/or allowing the customer to purchase sufficient resources for indexing the custom tag being configured. The various options and presented guidance may increase the efficiency of processing performed by the tag indexing and metrics computation system (e.g., reducing power consumption, reducing metric computation time, reducing processing unit load, reducing memory used, etc.).

Configured custom tags may be stored in a tag information datastore. The tag processing system may use the tag information datastore (e.g., including predefined tags and/or custom tags) to determine how to extract information and/or metrics from user interaction data. Further, the indexed tags included in the tag information datastore, in combination with user interaction data, may be used by a tag indexing and metrics computation system to compute metrics associated with the user interaction data.

The tag processing system, via the tag indexing and metrics computation system, may parse/filter/group the user interaction data using the tags included in the tag information datastore. The tag processing system may compute metrics according to the values and metrics defined by indexed tags. The tag processing system may store the computed metrics in a datastore. The analytics system may enable analytics users to run queries against the computed metrics to, for example, retrieve user interaction data that meets criteria specified in a query, such as user interaction including a set of one or more keys, one or more values, or represented by one or more computed metric values.

Certain implementations include techniques for receiving tag information identifying a custom tag to be created for user interaction data for a customer. The user interaction data for the customer comprises data relating to one or more user interactions with a web application or a mobile application. The user interaction data comprises a set of one or more keys and a set of one or more values corresponding to the set of one or more keys. The tag information identifies a set of parameters for the custom tag. The set of parameters may include a parameter key identifying a first key from the set of one or more keys, a parameter value set of one or more values for the first key, and a parameter metric set of one or more metrics for the custom tag. The techniques further include receiving an indication that the custom tag is to be indexed and creating the custom tag for the customer, wherein the custom tag is a custom indexed tag.

The techniques may further include performing processing to determine whether the custom tag can be indexed. The processing to determine whether the custom tag can be indexed may include determining a cardinality value based on a number of values in the parameter value set and a number of metrics in the parameter metric set, determining a predetermined cardinality threshold value, and comparing the cardinality value with the predetermine cardinality threshold value. Upon determining, based on the comparison, that the cardinality value exceeds the cardinality threshold value, information may be output indicating that the custom tag cannot be indexed. Upon determining, based on the comparison, that the cardinality value exceeds the cardinality threshold value, the resources associated with the customer may be increased, the parameter value set may be adjusted, and/or the parameter metric set may be adjusted. Upon determining, based on the comparison, that the cardinality value does not exceed the cardinality threshold value, information may be output indicating that the custom tag can be indexed. The processing to determine whether the custom tag can be indexed may include identifying resources associated with the customer, identifying, from the resources associated with the customer, resources available to the customer, and comparing (i) the resources to process the parameter value set and the parameter metric set with the (ii) resources available to the customer. Upon determining, based on the comparison, that the resources to process the parameter value set and the parameter metric set exceeds the resources available to the customer, information may be output indicating that the custom tag cannot be indexed. Upon determining, based on the comparison, that the resources to process the parameter value set and the parameter metric set exceeds the resources available to the customer, processing may be performed such that the resources available to the customer are great enough to index the custom tag, the processing may include (i) increasing the resources associated with the customer and/or (ii) adjusting the set of parameters. Upon determining, based on the comparison, that the resources to process the parameter value set and the parameter metric set does not exceed the resources available to the customer, information may be output indicating that the custom tag can be indexed.

The processing to determine whether the custom tag can be indexed may include identifying resources associated with the customer, identifying, from the resources associated with the customer, resources available to the customer, and performing processing such that the resources available to the customer are great enough to index the custom tag. Performing processing such that the resources available to the customer are great enough to index the custom tag may include increasing the resources associated with the customer and/or adjusting the set of parameters. Adjusting the set of parameters may include reducing a number of values in the parameter value set and/or changing the values included in the parameter value set. Adjusting the set of parameters may include reducing a number of metrics in the parameter metric set and/or changing the metrics included in the parameter metric set.

The techniques may further include receiving the user interaction data and determining analytics for the user interaction data. The determination may include determining a set of values in common between (i) the parameter value set and (ii) the set of one or more values corresponding to the parameter key in the set of one or more keys. The determination may include computing each metric in the parameter metric set based at least on each value in the set of values in common to include in the analytics. The techniques may further include presenting the analytics.

FIG. 1 illustrates an example distributed environment 100 incorporating an observability system 122 according to certain embodiments. As distributed environment 100 include any number of user devices 106 communicatively coupled with an observability system 122. In certain implementations, the user devices 106 may be communicatively coupled with the observability system 122 using one or more communication networks. Examples of such communication networks include the Internet, public networks, private networks, and the like. Various communication protocols may be used for the communications.

The observability system 122 may be implemented using one or more data processing systems and computing devices. As shown, the observability system 122 comprises multiple systems and subsystems. The systems in FIG. 1 include an ingestion system 126, a storage system 128, a tag processing system 130 including a custom tag configuration system 132, and an analytics/dashboard system 136.

Observability system 122 depicted in FIG. 1 is merely an example and is not intended to unduly limit the scope of claimed embodiments. Many variations, alternatives, and modifications are possible. For example, in some implementations, the observability system 122 may have more or fewer systems or subsystems than those shown in FIG. 1, may combine two or more systems or subsystems, or may have a different configuration or arrangement of systems or subsystems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device) and executed by one or more processors of the observability system 122.

In certain implementations, the observability system 122 may be implemented in a cloud environment using infrastructure provided by a cloud service provider (CSP). In such an embodiment, the functions performed by the observability system 122 and described in this disclosure may be offered via a cloud service to one or more customers subscribing to the cloud service.

The user devices 106 may include mobile devices (e.g., a tablet, a mobile phone) and non-mobile user devices 106 (e.g., a desktop computer). The distributed environment 100 may be configured to monitor user interaction data 120 produced by the user devices 106. The user interaction data 120 may be transmitted from the user devices 106 to the observability system 122.

User devices 104 may run a mobile application 110, a browser 112, or another front end application. The browser 112 may be a web browser and may be used to access a website hosted on a web server. The website 116 may include one or more web pages 118. The website 116 may include static information. The website 116 may include one or more web applications 140. The one or more web applications 140 may include dynamic information.

A user device 104 may also include any number of agents 108 that can be instantiated to monitor the front end application (e.g., browser 112a) of the user device 104 (e.g., a mobile device). The agents 108 may be configured to collect user interaction data 120, such as data sent to the user devices 104, data transmitted from the user devices 104, data generated by the user devices 104, and metadata associated with the data stored by the user devices 104. For example, the agents 108 may monitor user interactions to generate user interaction data 120 in the form of spans and traces.

The user interaction data 120 may be organized using keys and corresponding values. For example, a first user interaction data 120 may include a key of "User_ID" that corresponds to a value of "Alice." The user interaction data 120 may additionally or alternatively include a second key of "Browser" that corresponds to a value of "Browser1." A second user interaction data 120 may include a key of "User_ID" that corresponds to a value of "Bob." The user interaction data 120 may additionally or alternatively include a second key of "Browser" that corresponds to a value of "Browser2."

The websites 116 may include any number of agents 108 that can be instantiated to monitor the web pages 118 and/or the web applications 140. The agents 108d and agent 108e instantiated to monitor the websites 116a and 116b, respectively, may be running on a respective web server that hosts the respective websites 116. The agents 108 that monitor the websites 116 may be configured to collect user interaction data 120, such as data sent to the websites 116, data transmitted from the websites 116, data generated by the websites 116, and metadata associated with the data stored by the websites 116. For example, the agents 108 may collect user interaction data 120 in the form of spans and traces. The agents 108 that monitor the websites may be configured to transmit the collected user interaction data 120 to the observability system 122.

The user devices 104 may receive user interactions 102. The user interactions 102 may include user input (e.g., keyboard input, touchscreen input, mouse input, microphone input, etc.). The user interactions 102 may cause the user devices 104 to send and/or receive information to and/or from a browser 112 or mobile application 110. The user interaction data 120 collected by the agents 108 may be transmitted to the observability system 122.

The mobile application 110 may be one of many mobile applications running on a user device 104. For example, the user device 104a may be running mobile application 110 and any number of other mobile applications (e.g., a social media mobile application, an email mobile application, etc.). The agent 108a may collect user interaction data 120 relating to the mobile application 110. The mobile application 110 may use networking capabilities of the user device 104a to perform mobile application 110 operations. In certain implementations, the mobile application 110 is capable of operating in an offline environment and the agent 108a may transmit user interaction data 120 to the observability system 122 as the mobile application runs or when the user device 104a has network connectivity to the observability system 122.

The browser 112 may be one of many browsers running on a user device 104. For example, the user device 104b may be running browser 112a and any number of other browsers 112. The agent 108b may be configured to collect user interaction data 120 related to operations of the browser 112. The agent 108b may transmit the collected user interaction data 120 to the observability system 122.

The user interaction data 120 may include data output by an agent 108 associated with a web application, a mobile application, or website. The user interaction data 120 may include one or more keys. Each key may correspond to one or more values included in the user interaction data 120. An example "product_id" key may correspond to products "P1, P2, P3, and P4." As an example, a key may be "OS Name" and may correspond to values "Windows, Linux, iPhone OS, Mac OS X."

User interaction data may be any data produced by a machine or component in an information technology (IT) environment reflecting activity in the IT environment. For example, user interaction data can be raw machine data that is generated by various components in IT environments, such as web applications, mobile applications, websites, etc. User interaction data can include system logs, network packet data, sensor data, application program data, error logs, stack traces, system performance data, etc. In general, user interaction data can also include performance data, diagnostic information, and many other types of data that can be analyzed to diagnose performance problems, monitor user interactions, and to derive other insights.

In some instances, the user interaction data can have a predefined format, where data items with specific data formats are stored at predefined locations in the data. For example, the user interaction data may include data values associated with keys in a database table. In other instances, user interaction data may not have a predefined format (e.g., may not be at fixed, predefined locations), but may have repeatable (e.g., non-random) patterns. This means that some user interaction data can comprise various data items of different data types that may be stored at different locations within the data. For example, when the data source is an operating system log, user interaction data can include one or more lines from the operating system log containing user interaction data that includes different types of performance and diagnostic information associated with a specific point in time (e.g., a timestamp). Certain implementations may be capable of extracting information from each user interaction data format.

Examples of components which may generate user interaction data to which tags can be applied to include, but are not limited to, web servers, application servers, databases, firewalls, routers, operating systems, and software applications that execute on computer systems, mobile devices, sensors, Internet of Things (IoT) devices, etc.

The observability system 122 may receive user interaction data 120 from any number of user devices 104 and/or websites. Thus, the observability system 122 may receive data from front end system components (e.g., user devices, browsers, mobile applications, etc.) and backend system components (e.g., websites, webpages, web applications, etc.). The observability system 122 may be configured to receive user interaction data 120, input from a tag configuring user 134, and/or input from an analytics user 138 to generate dashboards, reports, and other information that is representative of characteristics of the user interaction data 120. The observability system 122 may include at least a user monitoring system 124.

The user monitoring system 124 may be configured to receive user interaction data 120, input from a tag configuring user 134, and/or input from an analytics user 138 to generate dashboards, reports, and other information that is representative of characteristics of the user interaction data 120. In certain implementations, the user monitoring system 124 may be configured to receive user interaction data 120 that was generated by the front end system components and/or the back end system components. The user monitoring system 124 may include an ingestion system 126, a storage system 128, a tag processing system 130, and an analytics system 136. In certain implementations, one or more components of the user monitoring system 124 are associated with a specific customer and the user monitoring system may only receive user interaction data 120 associated with the specific customer.

The ingestion system 126 may be configured to receive the user interaction data 120 from one or more agents 108. The ingestion system 126 may be configured to add additional information to the user interaction data 120, such as when the user interaction data 120 was received, what customer the user interaction data 120 is related to, what user device 104 the user interaction data 120 was received from, etc.

The ingestion system may be configured to transmit the user interaction data 120 to the tag processing system 130. The predetermined user monitoring system 124 configurations may be made by the customer associated with the user monitoring system 124 or an administrator of the distributed environment 100. In certain implementations, the tag processing system 130 receives user interaction data 120 from the ingestion system 126 as the user interaction data 120 is received by the ingestion system 126. Such data may be referred to as streaming data.

The storage system 128 may include a database. The storage system 128 may be configured to store user interaction data 120 and metrics for retrieval by the analytics system 136. The storage system 128 may store a portion of the user interaction data 120 processed by the tag processing system 130. The user interaction data 120 stored by the tag processing system 130 may be based on the tags used to filter the user interaction data 120 received by the tag processing system 130. The user interaction data 120 stored by the storage system may be user interaction data 120 that has remained stored in the storage system 128 for a period of time (e.g., seconds, 1 minute, 1 day, 1 week, etc.). The analytics system 136 may be configured to query the storage system 128 for stored user interaction data 120. The query may be for all user interaction data 120 or for a subset of the user interaction data 120 based on one or more search conditions.

The tag processing system 130 may include a custom tag configuration system 132. The custom tag configuration system 132 may be configured to enable a tag configuring user 134 to configure custom tags and index custom tags. The indexed custom tags and the user interaction data 120 (e.g., from the ingestion system 126) may then be used by the tag processing system 130 to generate metric data. The metric data generated by the custom tag configuration system 132 may be transmitted to the analytics system 136 to be presented to an analytics user 138.

The analytics system 136 may be configured to generate information (e.g., dashboards, reports, etc.) to be presented to analytics user 138. The analytics system 136 may enable the analytics user 138 to configure how the metrics information is presented by the analytics system 136. The analytics system 136 may provide various tools (e.g., tag spotlight) with user interfaces that display information about tags (e.g., indexed tags, non-indexed tags, custom tags, default tags).

Figure 2:
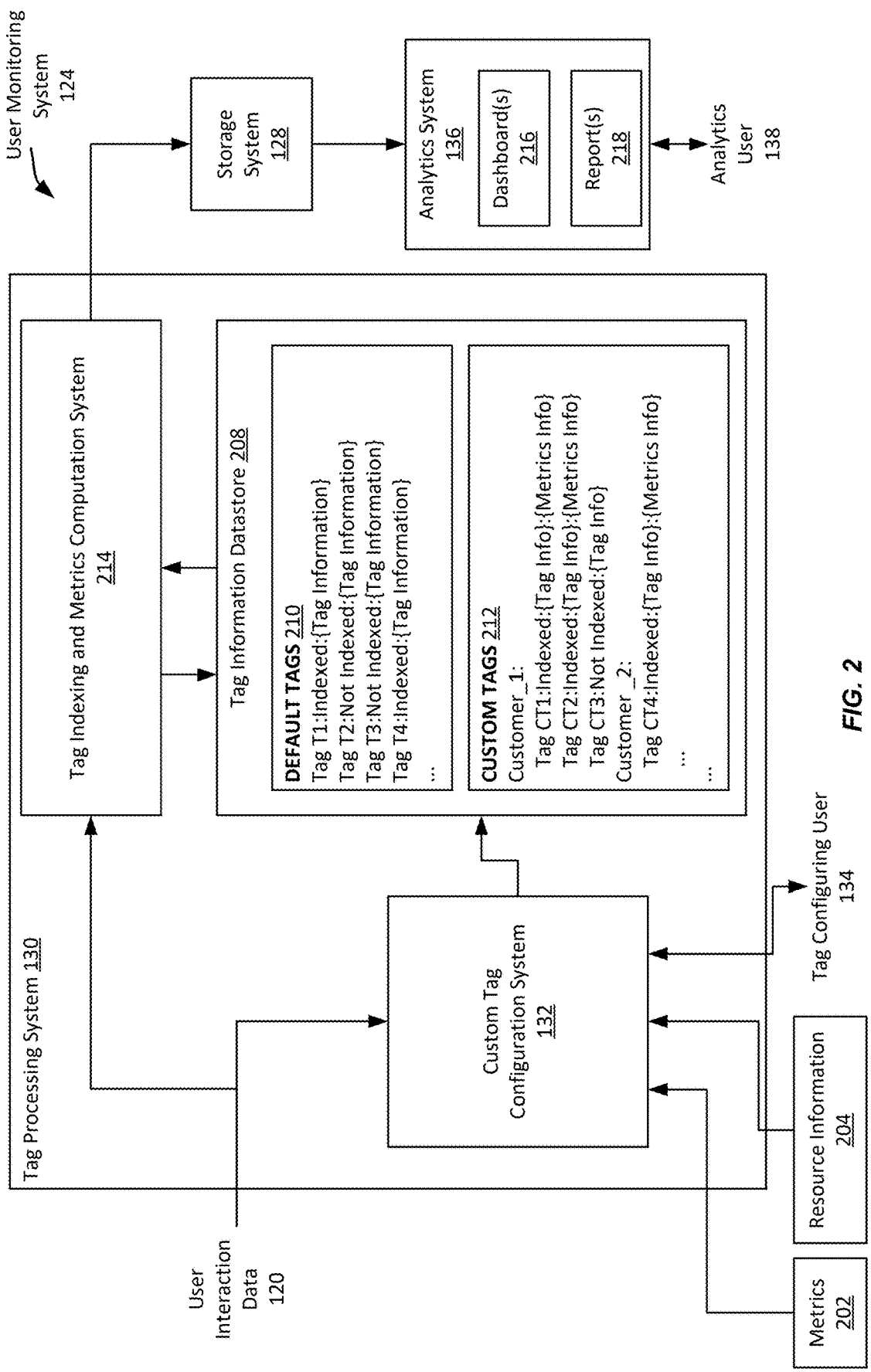
FIG. 2 illustrates a user monitoring system.

FIG. 2 illustrates a user monitoring system 124. The user monitoring system 124 may be the user monitoring system 124 described with respect to distributed environment 100. As mentioned above, the user monitoring system 124 may include a tag processing system 130 to process user interaction data 120 according to tags. The tag processing system 130 may include a custom tag configuration system 132, a tag indexing and metrics computation system, and a tag information datastore 208. The custom tag configuration system 132 may create and/or configure custom tags 212 to be indexed so that the tag indexing and metrics computation system may generate metrics according to the indexed custom tags.

The custom tag configuration system 132 may receive user interaction data 120. As mentioned above, the user interaction data 120 may be streaming user interaction data 120 or stored user interaction data 120 and may include one or more keys, and one or more values corresponding to each key. The user interaction data 120 may be used by the custom tag configuration system 132 to assist a tag configuring user 134 in creating a custom tag.

The custom tag configuration system 132 may be used by a tag configuring user 134 (e.g., via an interface (e.g., user interface, network interface)) of the custom tag configuration system 132.

The tag configuring user 134 may input a selection of a parameter key to the custom tag configuration system 132. The selection input by tag configuring user 123 may include at least one of: inputting the parameter key (e.g., including characters, numbers, etc.) into a text field or selecting the parameter key from a dropdown list of keys. The dropdown list of keys may be populated based on the unique keys in the set of one or more keys included in the user interaction data 120.

The tag configuring user 134 may input a second selection of a parameter value set to the custom tag configuration system 132. The second selection input by tag configuring user 123 may include at least one of: inputting the parameter value set into a text field or selecting the parameter value set from a dropdown list of values. The dropdown list of values may be populated based on the unique values in the set of one or more values corresponding to the set of one or more keys included in the user interaction data 120. The dropdown list of values may be populated based on the unique values in a set of values corresponding to the parameter key.

The tag configuring user 134 may input a third selection of a parameter metric set to the custom tag configuration system 132. The third selection input by tag configuring user 123 may include at least one of: inputting the parameter metric set into a text field or selecting the parameter metric set from a dropdown list of metrics. The dropdown list of metrics may be populated based on metrics 202. For example, the dropdown list of metrics may include all the metrics 202. In an example, the dropdown list of metrics includes a subset of the metrics 202. The subset may be based on which metrics relate to the parameter key, the parameter value set, the set of one or more unique keys included in the user interaction data 120, the set of one or more values included in the user interaction data 120.

The metrics 202 may include predefined metric definitions that can be computed based on one or more values. For example, the metrics 202 may include metric definitions for computing an average of a set of values, a mean of the set of values, a highest value of the set of values, a lowest value of the set of values, a count of unique values in the set of values, a histogram of the set of values, a standard deviation for the set of values, a $99^{th}$ percentile value for the set of values, etc. In certain implementations, the metrics 202 may be predefined and cannot be changed by the tag configuring user 134. In certain implementations, the tag configuring user 134 may be capable of adding or removing metric definitions to the metrics 202. The metrics 202 may be computed when the tag the metrics 202 are included in is indexed.

The custom tag configuration system 132 may be configured to receive resource information 204. The resource information may be for a specific customer. The specific customer may be the tag configuring user 134 or the specific customer associated with the tag configuring user 134. The resource information 204 may include processing information such as how many computer processing unit cores are associated and/or available to the specific customer or otherwise indicate how much processing resources are associated and/or available for computations to be performed in relation to the specific customer. The resource information may include how much storage (e.g., in the tag information datastore 208) is associated and/or available to the specific customer.

The custom tag configuration system 132 may allow for the tag configuring user 134 to input indications of which parameter key, parameter value set, and parameter metric set should be associated with the custom tag. Further, the custom tag configuration system 132 may perform processing to determine whether the custom tag can be indexed and identify to the tag configuring user 134 whether the custom tag can be indexed. For example, the custom tag configuration system 132 may determine whether there are enough resources available (e.g., to the specific customer) to compute the parameter metrics set for the parameter values set corresponding to the parameter key. For example, the custom tag configuration system 132 may determine whether the cardinality of the parameter metrics set and the parameter values set is too high. Based on the determination regarding whether the custom tag can be indexed by the custom tag configuration system 132, the custom tag configuration system 132 may prompt the tag configuring user 134 to perform adjustments to the parameter metrics set, the parameter values set, and/or the resources available to the specific customer. Based on the determination regarding whether the custom tag can be indexed by the custom tag configuration system 132, the custom tag configuration system 132 may inform the tag configuring user 134 of adjustments that could be made to the parameter metrics set, the parameter values set, and/or the resources available to the specific customer so that the custom tag can be indexed.

Based on the determination regarding whether the custom tag can be indexed by the custom tag configuration system 132, the custom tag configuration system 132 may prompt the tag configuring user 134 to perform adjustments to the parameter metrics set, the parameter values set, and/or the resources available to the specific customer.

After a custom tag has been created using the custom tag configuration system 132, the custom tag may be stored in the tag information datastore 208. The tag information datastore may include any number of default tags 210 and any number of custom tags 212. Each tag in the tag information datastore 208 may include tag attributes.

The tag attributes may identify tag information. The tag information may include a key (e.g., the parameter key selected by the tag configuring user 134) and a set of one or more values (e.g., the parameter value set selected by the tag configuring user 134) corresponding to the key.

The tag attributes may identify whether the respective tag is indexed or not indexed. When a tag is indexed, the tag indexing and metrics computation system 214 may use the indexed tag to determine analytics/metrics for the user interaction data 120 and transmit the analytics to the analytics system 136. In certain implementations, the tag indexing and metrics computation system 214 may use the indexed tag and user interaction data 120 to determine a subset of user interaction data 120 to be transmitted to a storage system 128 and/or the analytics system 136. The tag indexing and metrics computation system 214 may use the parameter metric set defined in an indexed tag to compute one or more metrics for the subset of user interaction data 120 to be transmitted to the storage system 128 and/or the analytics system 136.

The tag attributes may identify a set of metrics associated with the respective tag (e.g., the parameter metric set selected by the tag configuring user 134). In certain implementations, the default tags 210 do not include a tag attribute that identifies a set of metrics. In certain implementations, a default set of metrics is applied to each tag of the default tags 210, so each default tag does not need to individually include the set of metrics.

Each custom tag in the custom tags 212 may include a parameter metric set that is separate from the parameter metric sets associated with the other custom tags. The tag information may also include a unique identifier so that the associated respective tag may be identified separately from the other custom tags 212 or default tags 210.

The tag attributes may identify which customer the tag is associated with so that only user interaction data 120 associated with the same customer identified by the tag is determined using the tag indexing an metrics computation system 214 to cause analytics to be displayed for an analytics user 138 associated with the customer.

The default tags 210 included in the custom information datastore 208 may be tags that cannot be customized by the tag configuring user 134 and/or customer. The default tags 210 may include tags that are available to all customers. The tags included in the default tags 210 may include any number of indexed tags and any number of non-indexed tags. The default tags 210 may all be associated with a set of metrics to be computed for the keys and values identified by the tag information.

As an illustrative example, the default tags 210 includes at least four tags. One of the included tags may have a tag name of "Tag T1," which may be indexed, and may include tag information such as a key and a corresponding value set. For example, the key may be "OS Name" and the corresponding value set may include value elements "Windows, iPhone OS, Linux, Mac OS X."

As a second illustrative example, the custom tags 212 may include at least four tags. One of the included tags may be associated with "Customer_1" and have a tag name of "Tag CT1," which may be indexed, and may include tag information such as a parameter key and a corresponding parameter value set. For example, the parameter key may be "OS Version" and the corresponding parameter value set may include value elements "17.1.1, 17.0, 10.15.7, Synthetics, and 10.15." The tag with tag name "Tag CT1" may further include metrics information. The metrics information may include a parameter metric set that includes metrics elements that define metrics calculations for computing a 50th percentile, 75th percentile, and 99th percentile of response times associated with the parameter key and corresponding parameter value set. The response times associated with the parameter key and corresponding parameter value set may be included and/or derived from user interaction data 120.

The tag indexing and metrics computation system 214 may use user interaction data (e.g., from the ingestion system 126) to determine analytics for the user interaction data 120 according to one or more indexed tags in the tag information datastore. In certain implementations, the tag indexing and metrics computation system 214 determined analytics for a specific customer from a set of one or more customers.

In certain implementations, the tag indexing and metrics computation system 214 determines analytics for each user interaction data 120 received and the determined analytics may be determined based at least in part on the customer associated with the user interaction data 120. For example, the user interaction data 120 may be associated with a first customer and the tag indexing and metrics computation system 214 determines one or more analytics for the customer according to one or more indexed tags included in the tag information datastore 208 associated with the first customer.

The tag indexing and metrics computation system 214 may be configured to query the tag information datastore for indexed tags relating to the first customer associated with the user interaction data 120.

The tag indexing and metrics computation system 214 may receive indexed tags from the tag indexing and metrics computation system 214 so that the tag indexing and metrics computation system 214 can determine analytics for the user interaction data 120. Processing user interaction data 120 using a tag may be performed "on the fly," to identify a subset of user interaction data 120 that corresponds to the parameters defined in the tag and/or determining analytics/metrics based on the tag. The tag indexing and metrics computation system 214 may determine analytics by determining a set of values in common between (i) the parameter value set included in the indexed tag corresponding to a parameter key and (ii) a set of one or more values included in the user interaction data 120 corresponding to a key included in the user interaction data 120, and then computing each metric in the parameter metric set included in the indexed tag based at least on each value in the set of values in common that is included in the user interaction data 120. The computed metrics may be included in the analytics. The analytics may be transmitted to the analytics system 136 for display.

The analytics system 136 may present (e.g., audibly, visually, haptically) analytics. The analytics may be received from the tag indexing and metrics computation system 214. The analytics may be included in one or more dashboards 216 and/or one or more reports 218. The dashboards 216 and/or reports 218 may include infographics, data visualizations, heatmaps, data animations, word clouds, mixed reality (e.g., augmented reality, spatial computing, virtual reality) dashboards, audio reports, text files, data art, etc. The analytics may be presented to an analytics user 138. The analytics user 138 may be a different user from the tag configuring user 134. The analytics user 138 may be associated with the customer.

Figure 7:
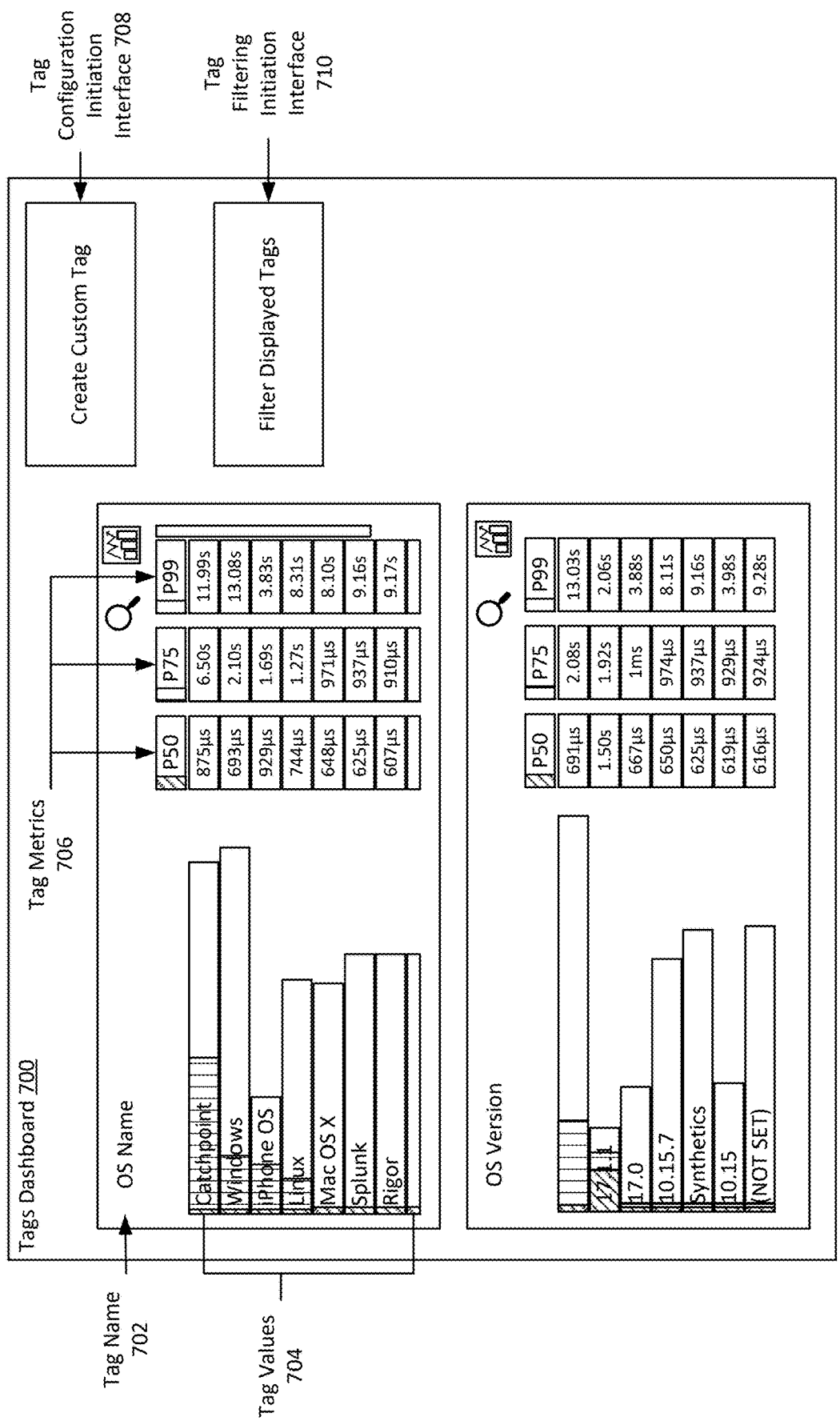
FIG. 7 illustrates an example tags dashboard interface.

As an example, the analytics system 136 may present a dashboard like a custom tags dashboard 700 illustrated in FIG. 7. The custom tags dashboard 700 is discussed below in further detail.

Figure 3:
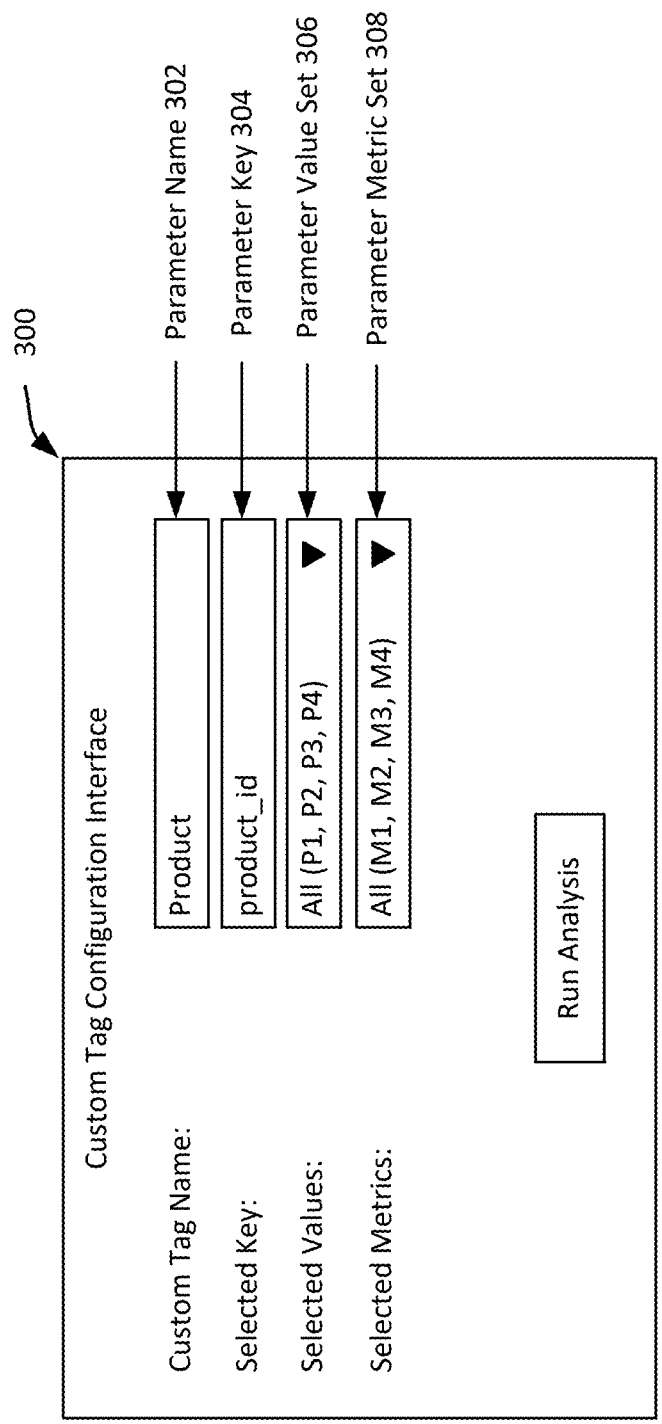
FIG. 3 illustrates an example custom tag configuration interface.

FIG. 3 illustrates an example custom tag configuration interface 300. The custom tag configuration interface 300 may be presented to a tag configuring user (e.g., the tag configuring user 134 described with respect to FIG. 2) by a custom tag configuration system (e.g., the custom tag configuration system 132 described with respect to FIG. 2). The custom tag configuration interface 300 may enable the tag configuring user to select a custom tag name, a custom tag key, custom tag values, and custom tag metrics. Selecting the name, key, values, and metrics may be performed by the tag configuring user entering numerical, alphabetical, alphanumerical, etc. input into a field. Selecting the name, key, values, and metrics may be performed by the tag configuring user choosing the input from a dropdown which may be populated based on the unique name, key, values, and/or metrics available for the user to choose from.

The custom tag name may be a user recognizable name assigned to the custom tag. The custom tag name may be assigned to the custom tag by the tag configuring user selecting (e.g., entering, choosing) a parameter name 302 to be used as the custom tag name. The custom tag name may assist in a user recognizing the custom tag from a set of custom tags. The custom tag name may appear in a configuration user interface so that an analytics user can more quickly and easily recognize the custom being configured. The custom tag name may appear in a dashboard generated by the analytics system, and/or a report generated by the analytics system so that an analytics user can more quickly and easily recognize the custom indexed tag that corresponding metrics are associated with. In the illustrated example, the parameter name 302 selected by the tag configuring user is "Product" and the tag configuring user entered the text into a text field.

The selected key may be assigned to the custom tag by the tag configuring user selecting (e.g., entering, choosing) a parameter key 304. The parameter key 304 may be a key included in the user interaction data 120 associated with the tag configuring user 134 and/or the customer that the tag configuring user 134 is associated with. The parameter key 304 may be included in a set of keys capable of being included in the user interaction data 120. The parameter key 304 may correspond to a set of one or more values. In the illustrated example, the parameter key 304 is "product_id" and the tag configuring user entered the text into a text field.

The selected values may be assigned to the custom tag by the tag configuring user selecting (e.g., entering, choosing) a parameter value set 306. The parameter value set 306 may be at least one of the values included in the user interaction data 120 associated with or capable of being associated with the tag configuring user 134 and/or the customer that the tag configuring user 134 is associated with. The parameter value set 306 may correspond to a key. The parameter value set 306 may correspond to the selected parameter key 304. In the illustrated example, the parameter value set 306 includes "P1, P2, P3, P4" and the custom tag configuring user chose the parameter value set 306 from a dropdown list of values. The dropdown list of values may include the values corresponding to the selected parameter key 304.

The selected metrics may be assigned to the custom tag by the tag configuring user selecting (e.g., entering, choosing) a parameter metric set 308. The parameter metric set 308 may be at least one of the metrics capable of being associated with the tag configuring user 134 and/or the customer that the tag configuring user 134 is associated with. In the illustrated example, the parameter metric set 308 includes "M1, M2, M3, M4" and the custom tag configuring user chose the parameter metric set 308 from a dropdown list of metrics. In certain implementations, the tag configuring user may enter metric definitions to be included in the parameter metric set 308 into a text field of the custom tag configuration interface 300. For example, the tag configuring user may enter a metric definition such as "AVG(Values( ))" which may define the metric for computing the average of the parameter value set. In another example, the tag configuring user may select a metric definition that calculates the average measured latency for each value (e.g., OS Version value) in the parameter value set, the measured latency may be identified as a variable for the metric definition and may be included in the user interaction data 120 and identified using a key (e.g., a latency related key).

One of ordinary skill in the art with the benefit of the present disclosure would recognize the other ways in which a custom metric definition may be selected by the tag configuring user for customized metrics definitions to be included in the parameter metric set 308.

The custom tag configuration interface 300 may include a button or other interface element to save the configured custom tag. The custom tag configuration tag interface 300 may include a button or other interface element to run an analysis for the configured custom tag. Running an analysis on the configured custom tag may cause a process to be performed that determines whether the custom tag can be indexed. For example, a cardinality value of the configured custom tag may be compared to a predetermined cardinality threshold value. In an example, the resources to be used (e.g., estimated, actual) for indexing the configured custom tag may be determined and compared to resources associated with and/or available to a customer the tag configuring user is associated with to determine if the resources associated with and/or available to the customer are great enough for indexing the configured custom tag.

In certain implementations, if the determination determines that the custom tag can be indexed, the configured custom tag is saved to a tag information datastore and is indexed. In certain implementations, if the determination determines that the custom tag cannot be indexed, then the tag configuring user may be prompted, and/or instructed on how, to modify the configured custom tag to be capable of being indexed. For example, the custom tag configuration system may enable the user to adjust the parameter metric set 308, the parameter value set 306, and/or the resources available to the customer associated with the tag configuring user. Interfaces to enable the above adjustments by the user are described in more detail below.

Figure 4:
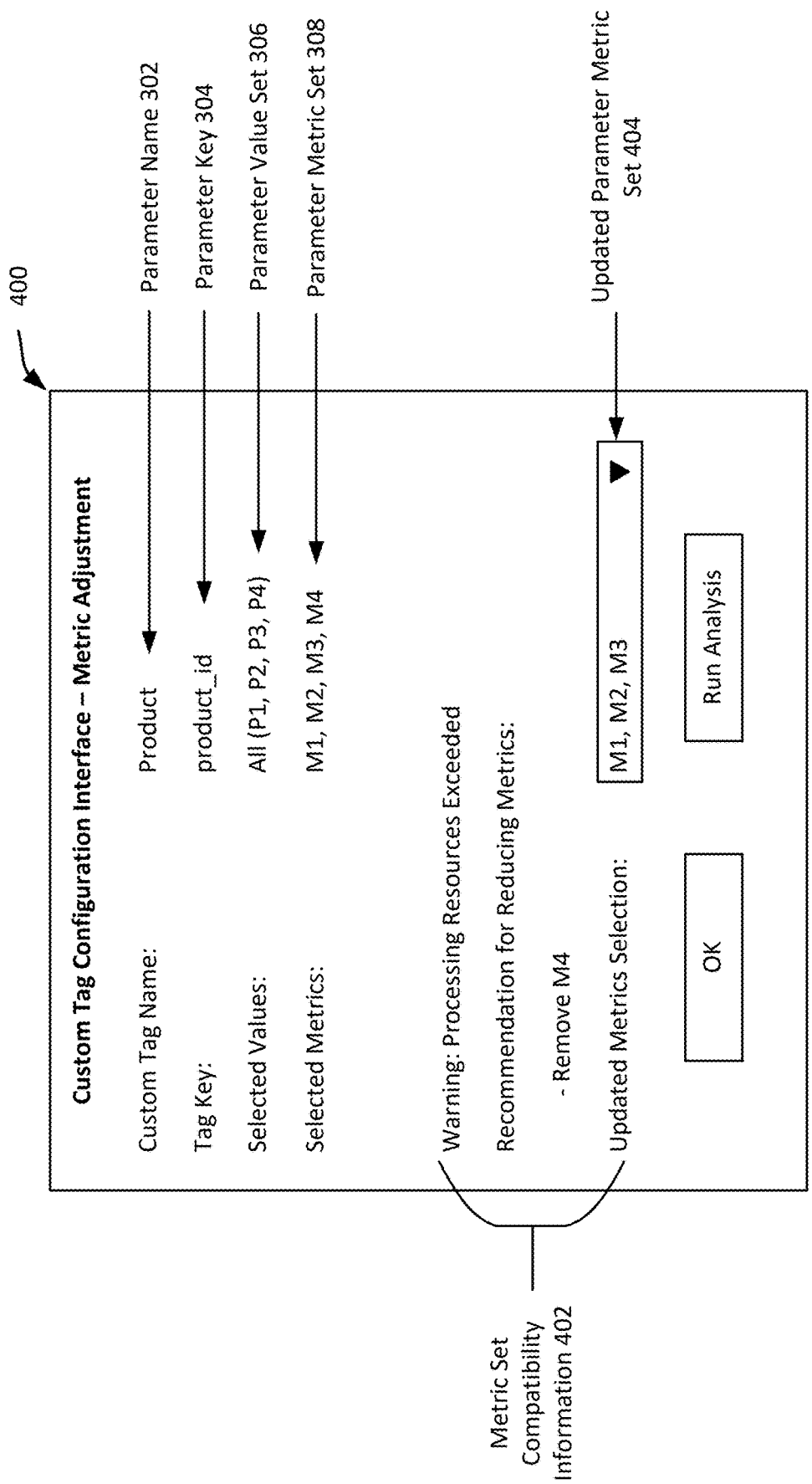
FIG. 4 illustrates an example metric adjustment interface.

FIG. 4 illustrates an example metric adjustment interface 400. The metric adjustment interface 400 may be presented to a tag configuring user (e.g., the tag configuring user 134 described with respect to FIG. 2) by a custom tag configuration system (e.g., the custom tag configuration system 132 described with respect to FIG. 2). The metric adjustment interface 400 may enable the tag configuring user to adjust the set of metrics included in the parameter metric set 308 to identify an updated parameter metric set 404. The updated parameter metric set 404 may then be used to determine if a custom tag can be indexed and/or save the custom tag with the updated parameter metric set 404.

In certain implementations, the metric adjustment interface 400 is presented to the tag configuring user to allow the tag configuring user to adjust which metrics are included in the updated parameter metric set 404. The updated parameter metric set 404 may be selected by the tag configuring user in a similar manner that the parameter metric set 308 was selected by the tag configuring user. The updated parameter metric set 404 may be selected by the tag configuring user based at least one the metric set compatibility information 402.

In certain implementations, the metric adjustment interface 400 may present metric set compatibility information 402 to the tag configuring user. The metric set compatibility information 402 may indicate to the tag configuring user that the custom tag cannot be indexed. The metric set compatibility information 402 may indicate to the tag configuring user that one or more metrics included in the parameter metric set 308 should be removed from the parameter metric set 308. The metric set compatibility information 402 may indicate to the tag configuring user which one or more metrics from the parameter metric set 308 should be removed from the parameter metric set so that the configured custom tag can be indexed (e.g., based on cardinality and/or resource constraints).

The metric adjustment interface 400 may enable the tag configuring user to update the selected metrics to be associated with the configured custom tag, allowing the tag configuring user to select metrics to be included in the updated parameter metric set 404 to be included in the custom tag.

In certain implementations, if the tag configuring user selects the updated parameter metric set 404 in a manner that is consistent with the recommendation(s) made by the metric set compatibility information 402, a custom tag indexability analysis does not need to be run and the custom tag can be saved to a tag information datastore (e.g., the tag information datastore 208) and indexed.

In certain implementations, if the tag configuring user selects the updated parameter metric set 404 in a manner that is inconsistent with the recommendation(s) made by the metric set compatibility information 402, a custom tag indexability analysis is run to determine whether the custom tag can be indexed. In certain implementations, if the determination determines that the custom tag can be indexed, the configured custom tag is saved to the tag information datastore and is indexed. In certain implementations, if the determination determines that the custom tag cannot be indexed, then the tag configuring user may be prompted, and/or instructed on how to modify the configured custom tag to be capable of being indexed. For example, the custom tag configuration system may enable the user to adjust the updated parameter metric set 404, the parameter value set 306, and/or the resources available to the customer associated with the tag configuring user.

Figure 5:
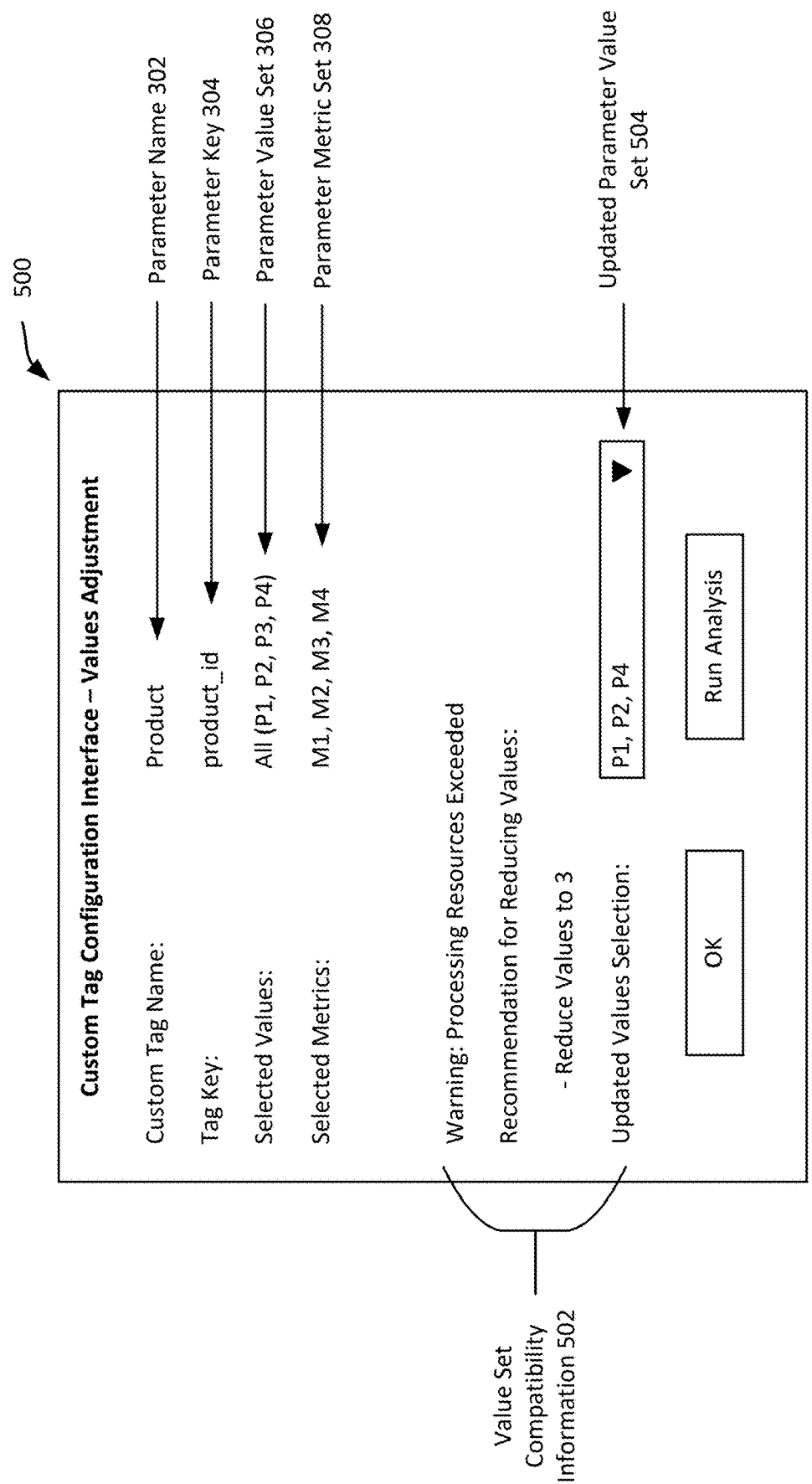
FIG. 5 illustrates an example value adjustment interface.

FIG. 5 illustrates an example value adjustment interface 500. The value adjustment interface 500 may be presented to a tag configuring user (e.g., the tag configuring user 134 described with respect to FIG. 2) by a custom tag configuration system (e.g., the custom tag configuration system 132 described with respect to FIG. 2). The value adjustment interface 500 may enable the tag configuring user to adjust the set of values included in the parameter value set to identify an updated (e.g., fewer values and/or different values) parameter value set 504. The updated parameter value set 504 may then be used to determine if a custom tag can be indexed and/or save the custom tag with the updated parameter value set 504.

In certain implementations, the value adjustment interface 500 is presented to the tag configuring user to allow the tag configuring user to adjust which values are included in the updated parameter value set 504. The updated parameter value set 504 may be selected by the tag configuring user in a similar manner that the parameter value set 306 was selected by the tag configuring user. The updated parameter value set 504 may be selected by the tag configuring 770 user based at least on the value set compatibility information 502.

In certain implementations, the value adjustment interface 500 may present value set compatibility information 502 to the tag configuring user. The value set compatibility information 502 may indicate to the tag configuring user that the custom tag cannot be indexed. The value set compatibility information 502 may indicate to the tag configuring user that one or more values included in the parameter value set 306 should be removed from the parameter value set 306. The value set compatibility information 502 may indicate to the tag configuring user which one or more values from the parameter value set 306 should be removed from the parameter value set so that the configured custom tag can be indexed (e.g., based on cardinality and/or resource constraints).

The value adjustment interface 500 may enable the tag configuring user to update the selected values to be associated with the configured custom tag, allowing the tag configuring user to select values to be included in the updated parameter value set 504 to be included in the custom tag.

In certain implementations, if the tag configuring user selects the updated parameter value set 504 in a manner that is consistent with the recommendation(s) made by the value set compatibility information 502, a custom tag indexability analysis does not need to be run and the custom tag can be saved to a tag information datastore (e.g., the tag information datastore 208) and indexed.

In certain implementations, if the tag configuring user selects the updated parameter value set 504 in a manner that is inconsistent with the recommendation(s) made by the value set compatibility information 502, a custom tag indexability analysis is run to determine whether the custom tag can be indexed. In certain implementations, if the determination is that the custom tag can be indexed, the configured custom tag is saved to the tag information datastore and is indexed. In certain implementations, if the determination is that the custom tag cannot be indexed, then the tag configuring user may be prompted, and/or instructed on how to modify the configured custom tag to be capable of being indexed. For example, the custom tag configuration system may enable the user to adjust the updated parameter value set 504, the parameter metric set 308, and/or the resources available to the customer associated with the tag configuring user.

Figure 6:
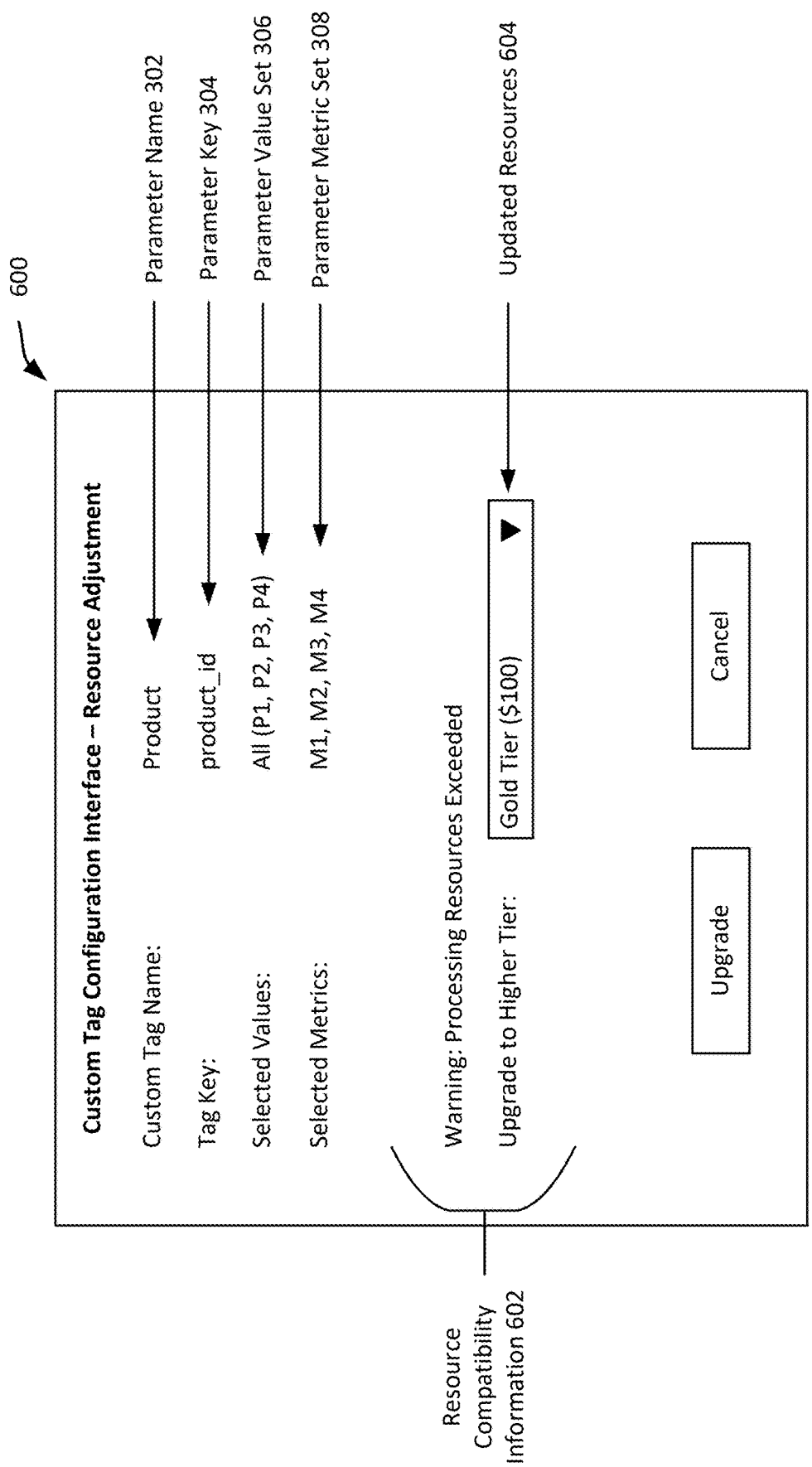
FIG. 6 illustrates an example resource adjustment interface.

FIG. 6 illustrates an example resource adjustment interface 600. The resource adjustment interface 600 may be presented to a tag configuring user (e.g., the tag configuring user 134 described with respect to FIG. 2) by a custom tag configuration system (e.g., the custom tag configuration system 132 described with respect to FIG. 2). The resource adjustment interface 600 may enable the tag configuring user to adjust the resource associated with the customer associated with the tag configuring user, so that updates resources 604 may be identified. The updated resources 604 may then be used to determine if a custom tag can be indexed and/or save the custom tag with the updated resources 604.

In certain implementations, the resource adjustment interface 600 is presented to the tag configuring user to allow the tag configuring user to adjust which resources (e.g., how much storage, how many central processing unit cores, how many computations per time period (e.g., second, minute, hour, day, etc.)) are associated with the customer that is associated with the tag configuring user. The updated resources 604 may be selected by the tag configuring user 134. For example, the user may choose to increase the amount of resources available to them by a custom amount or by a predetermined amount (e.g., based on customer resource allocation tier levels).

In certain implementations, the resource adjustment interface 600 may present resource compatibility information 602 to the tag configuring user. The updated resources 604 may be selected by the tag configuring user based at least on the resource compatibility information 602. For example, if the custom tag configuration system determines that a first number of resources would be needed to index the configured custom tag and the customer associated with the tag configuring user only has a second number of resources, which is less than the first number of resources, available, then the resource compatibility information 602 may display information that is capable of increasing the resources associated to a sufficient level so that the resources available to the customer are equal to or greater than the first number of resources that would be needed to index the configured custom tag.

The resource compatibility information 602 may indicate to the tag configuring user that the custom tag cannot be indexed. The resource compatibility information 602 may indicate to the tag configuring user that one or more resources associated with the tag configuring user should be increased above a threshold amount such that the resources available to the tag configuring user are great enough to index the configured custom tag. The resource compatibility information 602 may indicate to the tag configuring user which one or more resources should be increased so that the configured custom tag can be indexed.

The resource adjustment interface 600 may enable the tag configuring user to update the resources associated with the customer associated with the tag configuring user, allowing the tag configuring user to select from one or more options for additional resources that can be allocated to the customer.

In certain implementations, if the tag configuring user selects the updated resources 604 in a manner that is consistent with the recommendation(s) made by the resource compatibility information 602, a custom tag indexability analysis does not need to be run and the custom tag 840 can be saved to a tag information datastore (e.g., the tag information datastore 208) and indexed.

In certain implementations, if the tag configuring user selects the updated resources 604 in a manner that is inconsistent with the recommendation(s) made by the resource compatibility information 602, a custom tag indexability analysis is run to determine whether the custom tag can be indexed. In certain implementations, if the determination is that the custom tag can be indexed, the configured custom tag is saved to the tag information datastore and is indexed. In certain implementations, if the determination is that the custom tag cannot be indexed, then the tag configuring user may be prompted, and/or instructed on how to modify the configured custom tag to be capable of being indexed. For example, the custom tag configuration system may enable the user to adjust the parameter value set 306, the parameter metric set 308, and/or the resources available to the customer associated with the tag configuring user.

FIG. 7 illustrates an example tags dashboard 700 interface. In certain implementations, the dashboard interface includes one or more custom tags (e.g., custom tags 212 described with respect to FIG. 2) and/or one or more default tags (e.g., default tags 210 described with respect to FIG. 2). The tags dashboard 700 may receive analytics from a tag indexing and metrics computation system (e.g., the tag indexing and metrics computation system described with respect to FIG. 2). The analytics may be associated with one or more tags (e.g., custom indexed tags, default indexed tags). The tags dashboard 700 may receive a custom indexed tag, user interaction data, and/or portions of user interaction data based on the custom indexed tag from the tag indexing and metrics computation system. The tags dashboard 700 may receive a default indexed tag, user interaction data, and/or portions of user interaction data based on the default indexed tag from the tag indexing and metrics computation system.

The tags dashboard 700 may be presented to an analytics user (e.g., the analytics user described with respect to FIG. 2) The analytics user may be associated with the same customer as the tag configuring user. The analytics user may be the same user as the tag configuring user.

The tags dashboard 700 may present computed metrics (e.g., one or more metrics) associated with one or more indexed tags (e.g., custom indexed tags, default indexed tags). The computed metrics may be displayed in a manner such that the analytics user can determine that the computed metrics are associated with specific tag information that is also displayed on the tags dashboard 700.

As an example, the tags dashboard 700 illustrates a tag with a tag name 702 of "OS Name." The tag name may be a name assigned to the tag so that the tag is user recognizable by the analytics user and/or the tag configuring user. The tag name 702 may be assigned because a parameter key included in the custom tag may not be user recognizable, may not be in a desired format, etc. The illustrated example of the tags dashboard 700 further illustrates tag values 704. The tag values 704 may be the same values that were included in a parameter value set assigned to the tag during configuration of the tag. Each of the tag values 704 may be associated with a set of one or more tag metrics 706. The set of one or more tag metrics 706 may be the same metrics that were included in a parameter metric set assigned to the tag during configuration of the tag. In the illustrated example, the tags dashboard 700 illustrates the relationship between three tag metrics 706, a $50^{th}$ percentile, a $75^{th}$ percentile, and a $99^{th}$ percentile for a time operation (e.g., a page load duration) by operating system (OS). The distribution of the tag metrics 706 may be illustrated by using different colors, patterns, and/or other differentiating features. In the illustrated example, the tag values 704 are overlaid with a bar chart with three different patterns to show the distribution of the three different tag metrics 706.

The tags dashboard 700 may present a tag configuration initiation interface 708 that enables the analytics user to create and/or configure a custom tag. The analytics user 138 may be enabled to further configure a previously configured custom tag (e.g., one of the custom tags displayed by the tag dashboard 700). An analytics user interaction with the tag configuration initiation interface 708 may cause a custom tag configuration interface to be presented (e.g., the custom tag configuration interface 300 described with respect to FIG. 3).

Figure 8:
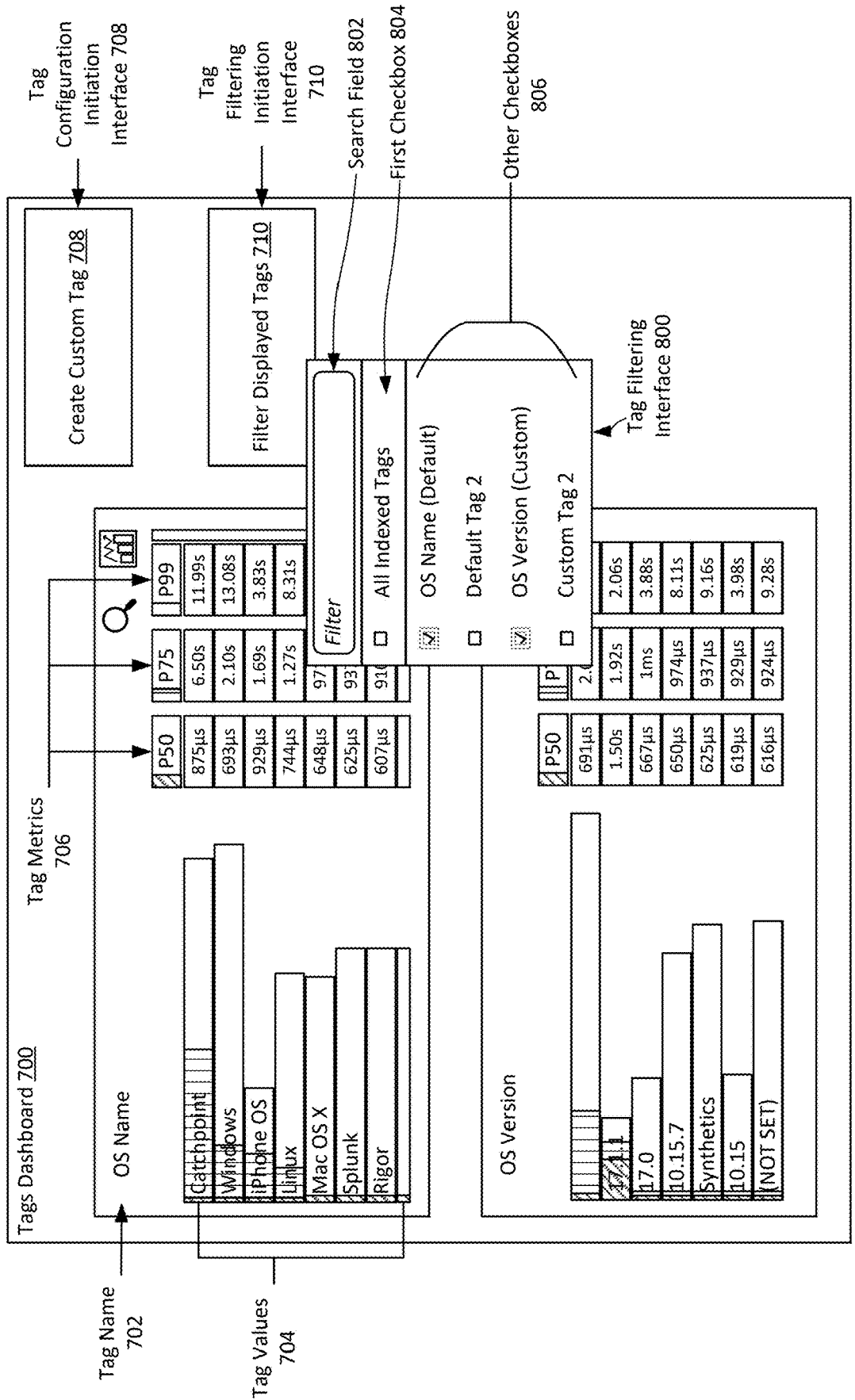
FIG. 8 illustrates an example tag filtering interface.

The tags dashboard 700 may present any number (e.g., zero or more) tags. The number of tags presented may be based at least on the number of tags that are indexed. The number of tags presented may be based at least on a filter that is applied to the displayed tags. The tags may be filtered after using a tag filtering initiation interface 710. The tag filtering initiation interface 710 may be interacted with (e.g., by the analytics user) to cause the presented tags to be filtered according to one or more filtering conditions/criteria. FIG. 8 illustrates what a tag filtering interface 800 may look like.

FIG. 8 illustrates an example tag filtering interface 800.

The tag filtering interface 800 may be presented after the analytics user interacts with the tag filtering initiation interface 710. The tag filtering interface 800 may include elements that enable the filtering of the presented tags in the tags dashboard 700. The tag filtering interface may present a list of tag names that can be activated or deactivated for being presented by the tags dashboard 700. The tag filtering interface 800 may present information indicating whether a tag is a custom tag or a default tag. In the illustrated example the tag filtering interface presented information indicating that the tag with a tag name of "OS Name" is a default tag and the tag with a tag name of "OS Version" is a custom tag.

The tag filtering interface 800 may include a search field 802 that the analytics user 138 may input search criteria in, the search field causing tag names presented in the tag filtering interface 800 to be filtered based on the input to the search field 802. In the illustrated example, the search field 802 includes no filtering criteria, so all tags names are displayed by the tag filtering interface 800.

The tag filtering interface 800 may include a first checkbox that enables all indexed tags to be activated for display by the tags dashboard 700. Responsive to the first checkbox being activated, all of the indexed tags may be presented in the tags dashboard 700. In the illustrated example, the tags with a tag name of "OS Name" and "OS Version" are activated to be presented by the tags dashboard 700. The tag filtering interface 800 may filter tags based on tag name, tag values, tag metrics, customer, and/or other data included in user interaction data that the presented tag metrics relate to.

Figure 9:
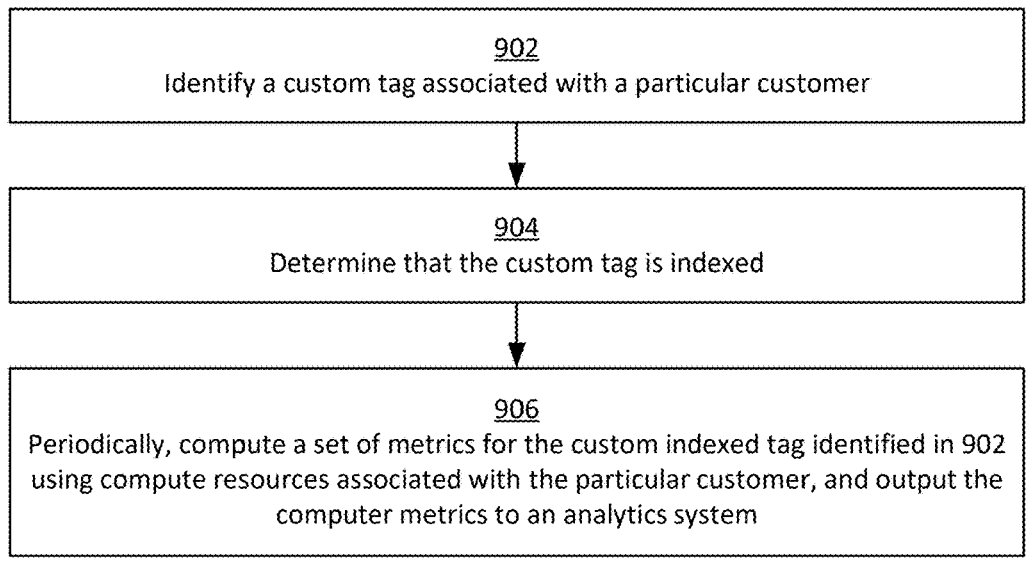
FIG. 9 is a simplified flow diagram that illustrates an example method for processing data for a custom indexed tag, according to certain embodiments.

FIG. 9 is a simplified flow diagram 900 that illustrates an example method for processing data for a custom indexed tag, according to certain embodiments. In certain implementations, the method depicted in FIG. 9 may be performed by a user monitoring system 124, which is part of an observability platform (e.g., observability system 122), as depicted in FIG. 1. As described above, user monitoring system 124 may receive user interaction data 120 for a customer, where the received data may include multiple datapoints, each datapoint comprising multiple key-value pairs. The processing depicted in FIG. 9 may be performed by user monitoring system 124 (e.g., by tag processing system 130) upon receiving these datapoints. For example, the data received by observability system 122 is processed by ingestion system 126 and then the data is forwarded to tag processing system 130 for processing. The method depicted in FIG. 9 may be performed as part of this processing. In some implementations, the user interactions data and one or more tags are received by the tag processing system 130 and user interaction data and/or metrics are processed and output to a storage system 128 (e.g., storage system 128) and/or an analytics system 136. The tag processing system 130 may perform the method depicted in FIG. 9 as part of this processing.

At 902, a custom tag associated with a particular customer may be identified. The custom tag may be stored in a tag information datastore. The custom tag may include the parameters described above (e.g., a parameter key, a parameter value set, a parameter metric set) A tag indexing and metrics computation system may identify the custom tag associated with the particular customer.

At 904, a determination that the custom tag is indexed may be performed. The determination may be performed by determining if the tag included an attribute that identifies that the custom tag is indexed. If the custom tag is indexed, 906 may be performed.

At 906, a set of metrics may be computed for the custom tag. The set of metrics computed for the custom tag may be a parameter metrics set included in the custom tag. The set of metrics may define one or more metrics to be computed for the key and corresponding values included in the custom tag. The key may be a parameter key. The values may be a parameter value set.

The set of metrics may be computed using compute resources associated with the particular customer. The customer may have a predetermined number of resources (e.g., based on resources allocated to the customer (e.g., based on how much money the customer is paying to a resource provider, based on how many resources the customer is already using, based on how many resources other customers are using)). The set of metrics may be computed if the resources are sufficient (e.g., great enough) to enable the computation to occur.

The computed set of metrics may be output to the analytics system. The computed set of metrics may be referred to as analytics. Each metric in the set of metrics may be computed based on at least one value in the values included in the custom tag. Each metric in the set of metrics may be computed based on at least one value in the parameter value set included in the custom tag that is common with the interaction values included in user interaction data used for computation of the computed set of metrics. The interaction values may correspond to an interaction key. The interaction key may be equal to (e.g., have the same value as) the key included in the custom tag.

In an example implementation, the metrics may correspond to a single value, such as an average latency for user interaction data associated with the Windows operating system being 60 ms. In an example implementation, the metrics may correspond to more than one value, such as an average latency across all operating systems associated with user interaction data.

Step 906 may be performed periodically. In certain implementations, 906 is performed when user interaction data is received, after a predetermined (e.g., based entries, based on space in memory) amount of user interaction data has been received, and/or when an analytics user initiates computation of the set of metrics, after a period of time (e.g., every 10 seconds, once a day, once a second). Accordingly, the computed set of metrics may be based on user interaction data 120 collected over a particular time period in accordance with one or more tags. The processing described in flow diagram 900 may be performed for each custom indexed tag and/or default indexed tag.

The processing depicted in flow diagram 900, and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in flow diagram 900, and other FIGS. and described herein are intended to be illustrative and non-limiting. Although flow diagram 900, and other FIGS., depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in flow diagram 900, and other FIGS., may include a greater number or a lesser number of steps than those depicted in the respective FIGS.

Figure 10:
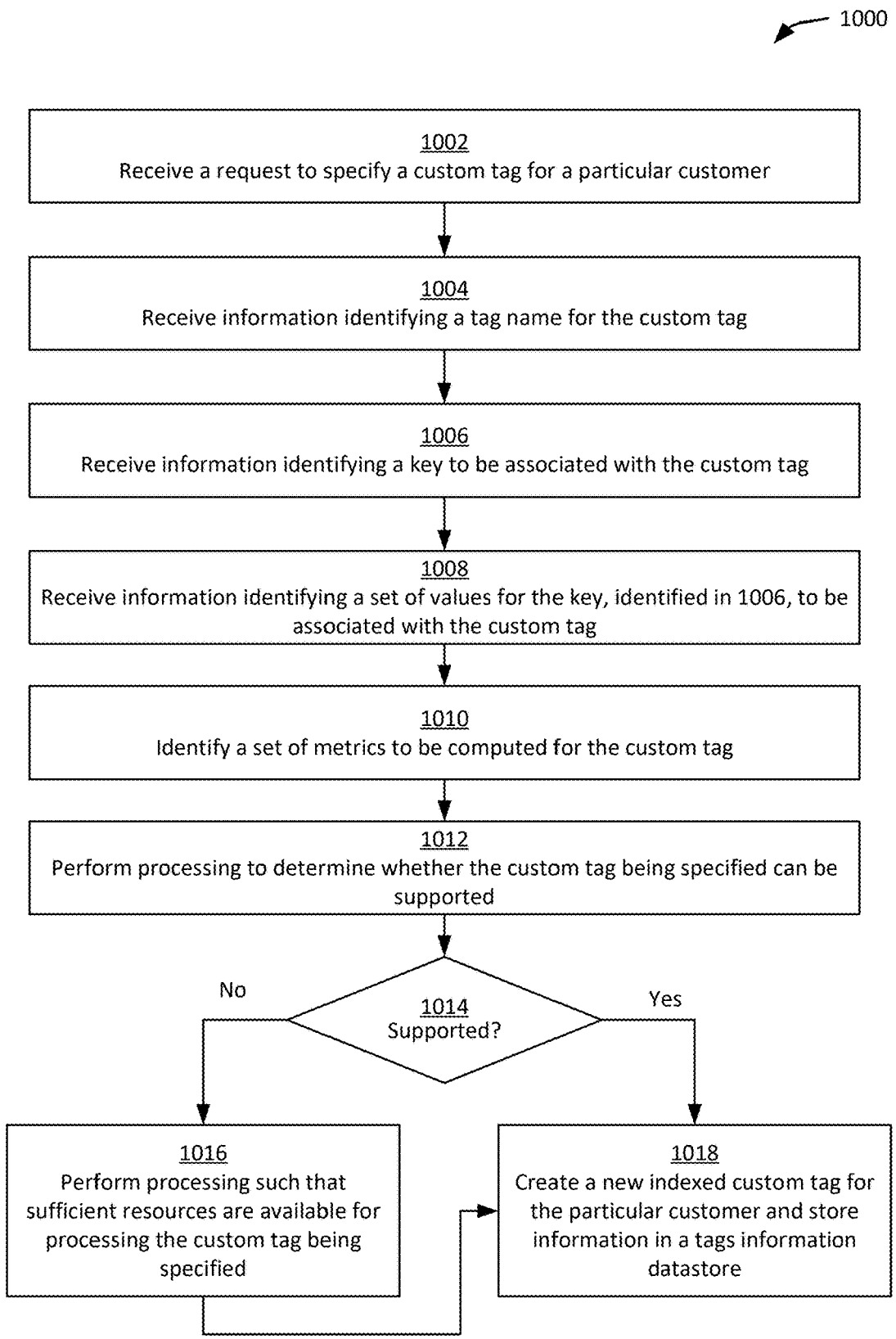
FIG. 10 is a simplified flow diagram that illustrates an example method for configuring a custom indexed tag, according to certain embodiments.

FIG. 10 is a simplified flow diagram 1000 that illustrates an example method for configuring a custom indexed tag, according to certain embodiments. The processing may be initiated at 1002, when a request is received to create a custom indexed tag for a particular customer. The request may be received, for example, from a user associated with the particular customer and responsible for creating tags to analyze the customer's data. For example, the user may be a system Reliability Engineer (SRE) associated with the particular customer. In certain implementations, the request may be received via a user interface (e.g., a graphical user interface or GUI) used by the user. Upon receiving the request, a set of GUIs may be presented to the user to facilitate providing information that is used for creating the custom indexed tag.

The custom tag being created may include a tag name, a tag key, a set of one or more tag values corresponding to the tag key, a set of one or more tag metrics, and/or an identifier of whether the custom tag is indexed. The custom tag may be indexed and used to compute metrics relating to user interaction data. The user interaction data may include data relating to one or more user interactions with a web application, a mobile application, or a web page.

At 1004, information may be received that identifies a parameter name (e.g., parameter name 302 described above) for the custom tag to be assigned as the tag name. The information may be received from the user interface used by the tag configuring user 134.

At 1006, information may be received that identifies a parameter key (e.g., parameter key 304 described above) for the custom tag to be assigned as the tag key. The information May be received from the user interface used by the tag configuring user 134. The parameter key may be a key that is included in user interaction data, or may be included in user interaction data, processed using the custom tag when the custom tag is indexed.

In certain implementations, one or more keys may be suggested to the tag configuring user based on keys that have been observed in previously seen user interaction data. The one or more keys may be displayed based on the particular customer. For example, the particular customer may cause user interaction data to be generated that includes the one or more keys. The tag configuring user may select the parameter key from the one or more keys suggested to the tag configuring user.

At 1008, information may be received that identifies a parameter value set (e.g., the parameter value set 306 described above) for the custom tag to be assigned as the set of one or more tag values. The information may be received from the user interface used by the tag configuring user 134. The parameter value set may be one or more values that are included in the user interaction data, or may be included in the user interaction data, processed using the custom tag when the custom tag is indexed.

In certain implementations, one or more values may be suggested to the tag configuring user 134 based on values that have been observed in previously seen user interaction data. The one or more values may be suggested based on the particular customer. For example, the particular customer may cause user interaction data to be generated that includes the one or more values. The tag configuring user may select the parameter value set from the one or more values suggested to the tag configuring user.

At 1010, information may be received that identifies a parameter metric set (e.g., the parameter metric set 308 described above) for the custom tag to be assigned as the set of one or more tag metrics. The information may be received from the user interface used by the tag configuring user 134. The parameter metric set may define one or more metrics to be computed for parameter values (e.g., using the parameter values in the computation (e.g., averaging the parameter values), the computation associated with the parameter values (e.g., averaging monitored latency user interaction data 120 associated with each parameter value) corresponding to the parameter key included in the custom tag that is in common with the one or more keys and corresponding set of one or more values included in the user interaction data.

In certain implementations, the parameter metrics set is a predefined parameter metric set and may or may not be configurable by the tag configuring user. In certain implementations, the parameter metrics set may be identified by the tag configuring user. For example, the tag configuring user may select (e.g., enter, choose) one or more metrics to be included in the parameter metric set.

At 1012, processing may be performed to determine whether the custom tag being specified in the steps 1004-1012 can be supported. If the custom tag being specified can be supported, then the custom tag being specified may be indexed. The processing may determine whether the cardinality of the custom tag being specified is too high, whether the resource utilization of the custom tag being specified is too high, and/or whether the resource utilization of the custom tag being specified is estimated to be too high, etc.

Figure 12:
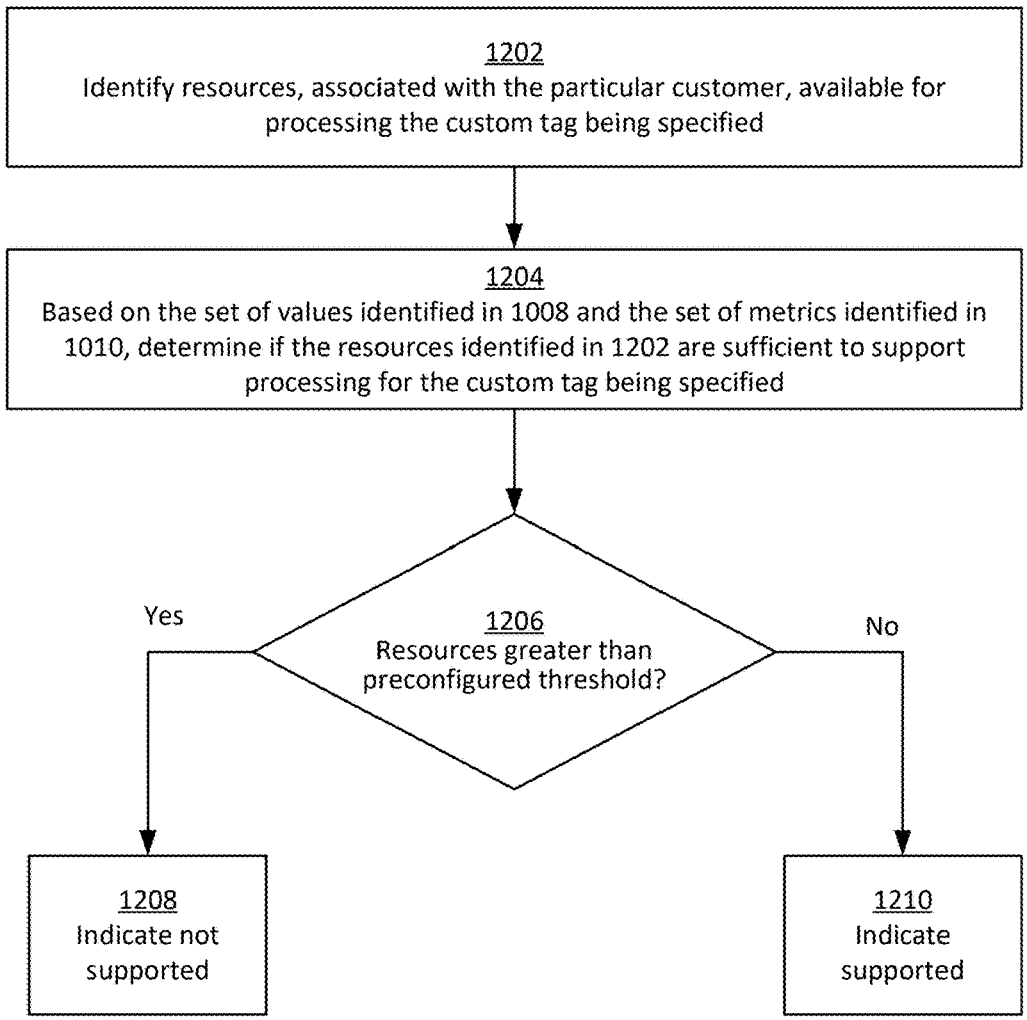
FIG. 12 is a simplified flow diagram that illustrates an example method for determining whether available resources are sufficient for a custom tag to be indexed, according to certain embodiments.
Figure 13:
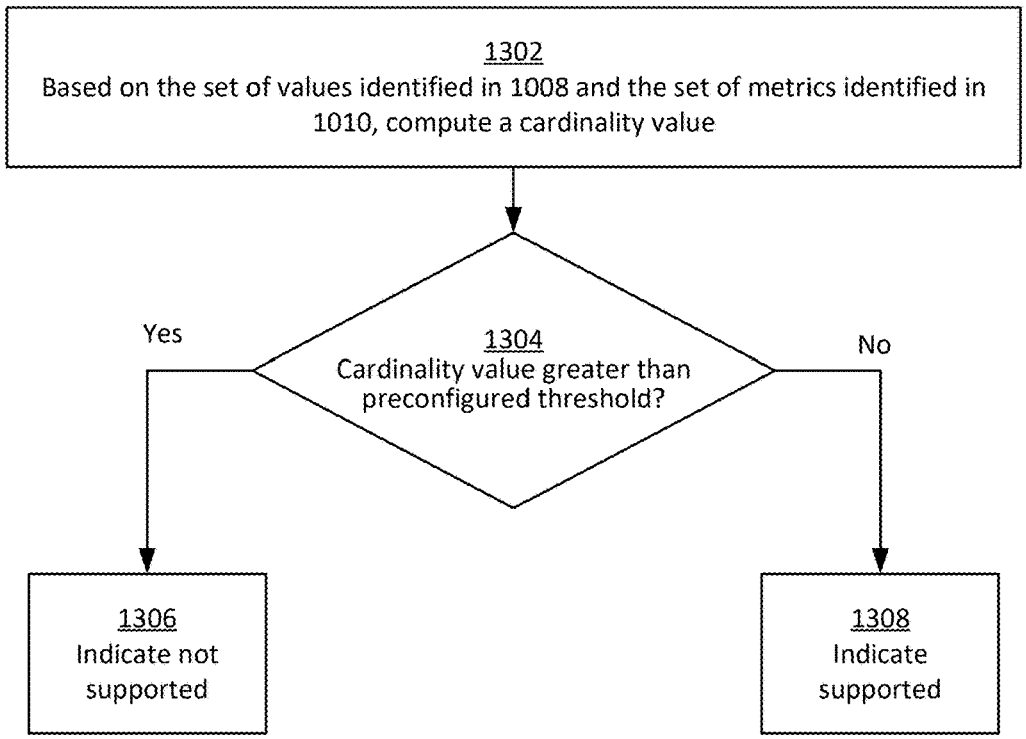
FIG. 13 is a simplified flow diagram that illustrates an example method for determining whether a cardinality value for custom tag parameters is too high to be indexed, according to certain embodiments.

The processing performed to determine whether the custom tag being specified is described in more detail in FIGS. 12 and 13, and the description thereof. Specifically, FIG. 12 and the description thereof describe determining if the resources available to process the custom tag being specified is greater than a preconfigured threshold. Specifically, FIG. 13 and the description thereof describe determining if the cardinality associated with the custom tag being specified is greater than a preconfigured threshold.

At 1014, if the processing performed at 1012 determines that the custom tag being specified can be supported, then 1018 is performed. If the processing performed at 1012 determines that the custom tag being specified cannot be supported, then 1016 is performed.

At 1016, processing is performed such that sufficient resources (e.g., network resources, memory resources, computational resources (e.g., CPU)) are available for processing the custom tag being specified (e.g., so that custom tag being specified can be indexed). Additionally, or alternatively, processing may be performed such that processing of the custom tag being specified does not result in the computational cardinality being too high.

Figure 11:
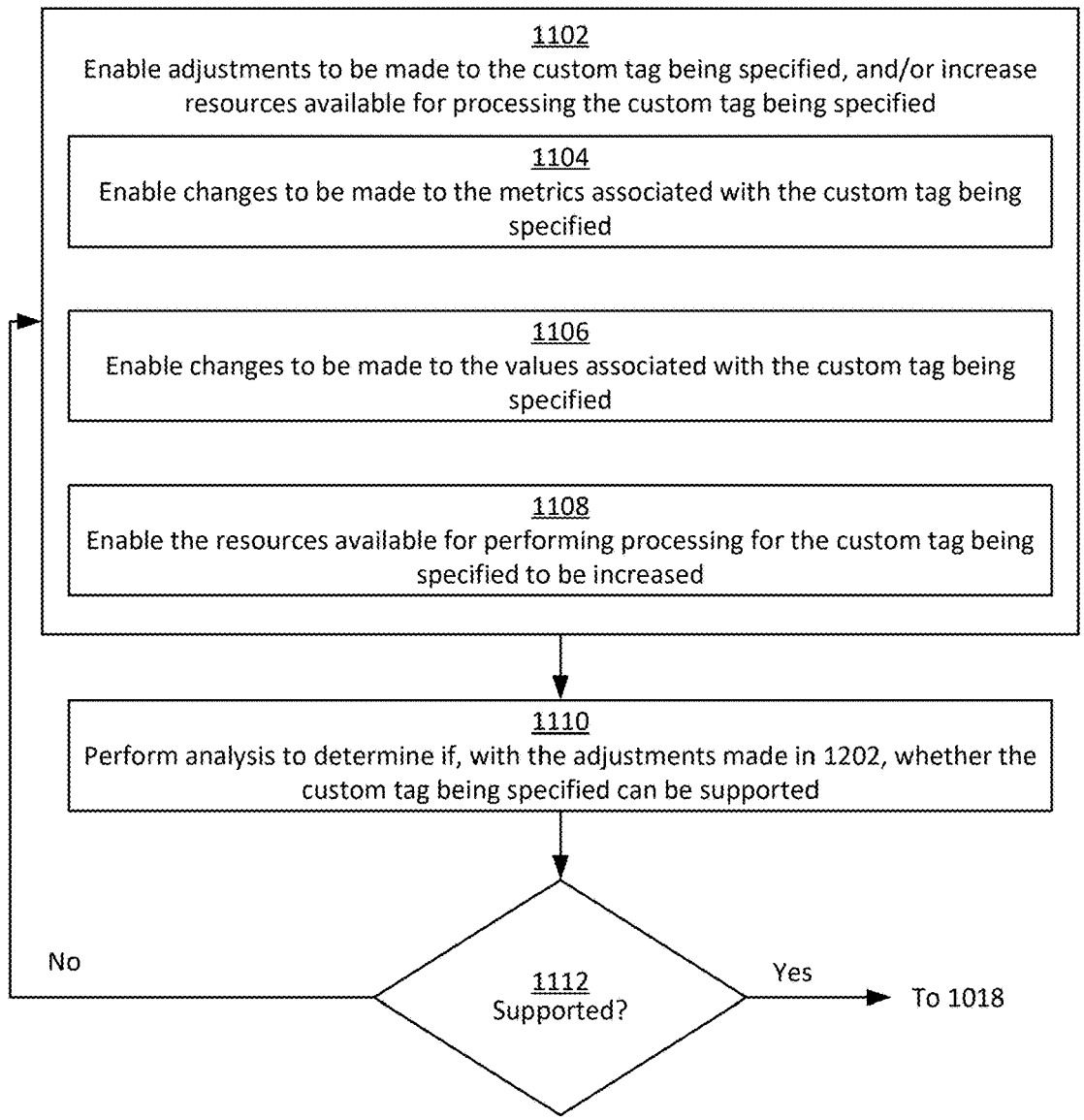
FIG. 11 is a simplified flow diagram that illustrates an example method for performing parameter adjustments to a custom tag, according to certain embodiments.

The processing performed during 1016 is further described with respect to FIG. 11 and the description thereof. The processing may be performed using a metric adjustment interface (e.g., the metric adjustment interface 400), a value adjustment interface (e.g., the value adjustment interface 500), a resource adjustment interface (e.g., the resource adjustment interface 600), or another interface that enables the tag configuring user 134 to adjust the parameter key, the parameter value set, and/or the parameter metric set of the custom tag, and/or the resources associated with the specific customer.

As an example, the processing performed at 1014 may determine that the custom tag being specified cannot be supported. In the example, the custom tag may include a parameter key of "Operating System," a parameter value set of "Windows, Mac OS, iPhone OS," and a parameter metric set for computing three latency distribution metrics for each value in the parameter value set of "$50^{th}$ percentile, $75^{th}$ percentile, and $99^{th}$ percentile." Accordingly, the three metrics computed for each of the three values will result in the $50^{th}$ percentile, $75^{th}$ percentile, and $99^{th}$ percentile being computed for each of the Windows, Mac OS, iPhone OS included in a set of user interaction data. As such, a total of 9 metrics are being computed. The tag processing system 130 may determine at 1014 that the computation of the 9 metrics cannot be supported because of at least one of resource constraints or cardinality constraints. As a result, 1016 may be performed to guide the use in reducing the metrics element count included in the parameter metric set and/or reducing the values element count included in the parameter value set to thereby decrease the resources used to compute the respective metrics and/or the cardinality of the computations. For example, the tag processing system may suggest to the user to reduce the number of value elements that the three metrics are computed for to a set of two (e.g., only Windows and Mac OS), which would thereby cause the total number of computed metrics to be six instead of nine. Similarly, the tag processing system could suggest to the user to reduce the number of metric elements computed for each value to a set of two metrics (e.g., only the $50^{th}$ percentile and the $75^{th}$ percentile) for each value, which would thereby cause the total number of computed metrics to be six instead of nine. As a result of the reduction in the parameter value set and/or the parameter metric set, the cardinality can be reduced and the resources used to compute the metrics can be reduced. In some implementations, the tag processing system could suggest to the user to increase the resources available for computing the parameter metric elements for the parameter values.

At 1018, if the processing performed at 1012 determines that the custom tag being specified can be supported or the processing performed at 1016 causes the custom tag being specified to be supported, the custom tag being specified may be indexed. The custom tag may be indexed, associated with the particular customer, and/or stored in a tag information datastore (e.g., the tag information datastore 208).

FIG. 11 is a simplified flow diagram 1100 that illustrates an example method for performing parameter adjustments to a custom tag, according to certain embodiments. The parameter adjustments may be performed by a tag configuring user using a custom tag configuration system (e.g., the custom tag configuration system 132). The parameter adjustments may be performed by a tag configuring user so that the custom tag can be indexed.

At 1102, adjustments may be enabled. The adjustments may be enabled responsive to determining that the custom tag being specified (e.g., the custom tag being specified in the example method illustrated in FIG. 10 and the corresponding description) cannot be supported at 1014. The adjustments may enable the custom tag being specified to be adjusted to decrease the resources required (e.g., estimated or actual) by the custom tag being specified. The resources required to process the custom tag being specified may be decreased by decreasing the number of values in the parameter value set and/or the number of metrics in the parameter metric set. The adjustments may enable the resources available to be used to index the custom tag being specified (e.g., the resources available to the customer associated with the custom tag being specified) to be increased such that the resources available are sufficient to enable the custom tag being specified to be indexed. Any combination of decreasing the number of metrics included in the parameter metric set, decreasing the number of values in the parameter value set, and/or increasing the resources available to the customer associated with the custom tag being specified may cause the custom tag being specified to be supported and therefore be indexed.

The adjustments may be performed by a user associated with the particular customer. The adjustments may be performed in response to input from the user received via a user interface (e.g., GUI). The user interface may be presented to the user after a custom tag configuration system determines that the custom tag cannot be indexed.

At 1104, changes to the metrics included in the parameter metric set included in the custom tag being specified may be enabled. The changes may be performed using an interface (e.g., the metric adjustment interface 400) that allows the tag configuring user to decrease the number of metrics included in the parameter metric set.

The changes may be performed automatically by a custom tag configuration system to decrease the number of metrics to a parameter matric set element count that is sufficient to allow for the custom tag being specified to be indexed. The interface may present information to the tag configuring user that conveys how the parameter metric set may be reduced so that the elements included in the parameter metric set are sufficient for the custom tag being specified to be indexed. In certain implementations, a first metric may require more resources than a second different metric (e.g., the first may require more computational cycles to be performed). As such, efficiently reducing the parameter metric set included in the custom tag being specified may not only depend on the number of metric elements removed from the parameter metric set, but may depend on which metric elements are removed from the parameter metric set.

At 1106, changes to the values included in the parameter value set included in the custom tag being specified may be enabled. The changes may be performed using an interface (e.g., the value adjustment interface 500) that allows the tag configuring user to decrease the number of values included in the parameter value set and/or change which values are included in the parameter value set.

The changes may be performed automatically by a custom tag configuration system to decrease the number of values to a parameter value set element count that is sufficient to allow for the custom tag being specified to be indexed. The interface may present information to the tag configuring user that conveys how the parameter value set may be reduced so that the elements included in the parameter value set are sufficient for the custom tag being specified to be indexed.

At 1108, changes to the resources allocated and/or available to the customer associated with the tag configuring user 134 may be enabled. The changes may be performed using an interface (e.g., the resource adjustment interface 600) that allows the tag configuring user to increase the number of resources associated with the customer that is associated with the custom tag being specified.

The interface may present information to the tag configuring user that conveys how the resources may be increased so that the custom tag being specified is sufficient to be indexed while maintaining the currently assigned parameter metric set and parameter value set. The interface may convey a monetary amount and/or other information that is associated with increasing the resources allocated to the customer. In certain implementations, increasing the resources allocated to the customer may cause an increase in a cardinality threshold.

Step 1110 may be performed after at least one of 1104, 1106, or 1108 have been performed. At 1110, an analysis may be performed to determine if, with the adjustments made in 1104, 1106, and/or 1108, whether the custom tag being specified can be indexed. The analysis may perform processing like performed at 1012, described above, to determine if the custom tag being specified is sufficiently configured to be indexed.

In certain implementations, the analysis is not performed because the parameter metric set, the parameter value set, and/or the resources allocated to the customer have been adjusted in accordance with a recommendation made by the custom tag configuration system.

At 1112 if the analysis performed at 1110 determines that the custom tag being specified can be supported, then 1018 may be performed. If the processing performed at 1110 determines that the custom tag being specified cannot be supported, then 1102 may be performed.

FIG. 12 is a simplified flow diagram that illustrates an example method 1200 for determining whether available resources are sufficient for a custom tag to be indexed, according to certain embodiments. The method 1200 may be performed during step 1012 described above to determine if a custom tag (e.g., the custom tag being specified at step 1012) can be indexed.

At 1202, resources may be identified. The identified resources may be resources associated with the customer that the custom tag being specified is associated with. The resources identified may be the resources available (e.g., not already allocated to other customer processes) of the total resources allocated to the customer. The resources may be network resources, storage resources, and/or computational resources (e.g., CPU cores, CPU operations, etc.).

At 1204, based on the parameter value set included in the tag (e.g., the parameter value set identified in 1008) and the parameter metric set (e.g., the parameter metric set identified in 1010) included in the tag, a determination may be made regarding how many resources are needed to index the custom tag. The resources needed to index the custom tag may be an estimated amount of resources or an actual amount of resources. The estimated amount of resources may be based on the historical information regarding how many resources would be needed for the parameter metric set and/or the parameter value set to be processed.

The determination may include a determination of whether the identified resources are sufficient to support processing for the custom tag to be indexed. For example, the identified resources may be a greater amount of resources than the estimated or actual resources needed to index the custom tag, resulting in a determination that the identified resources are sufficient to index the custom tag.

At 1206, if the analysis performed at 1204 determines that the custom tag can be supported, then processing continues with 1210 where an indication that the custom index as tag is supported by the identified resources is transmitted. If the processing performed at 1204 determines that the custom tag being specified cannot be supported, then processing continues with 1208, where an indication that the custom tag is not supported by the identified resources is transmitted.

FIG. 13 is a simplified flow diagram that illustrates an example method 1300 for determining whether a cardinality value for custom tag parameters is too high to be indexed, according to certain embodiments. The method 1300 may be performed during step 1012 described above to determine if a custom tag (e.g., the custom tag being specified at step 1012) can be indexed.

At 1302, the cardinality for the custom tag may be computed. The cardinality of the tag may be based on a parameter metric set included in the custom tag (e.g., the parameter metric set identified at 1010, above) and/or a parameter value set included in the custom tag (e.g., the parameter value set identified at 1008, above).

The cardinality of a tag may be defined by the max number of possible metrics to be computed for the custom tag. For example, if the tag includes 5 value elements and 3 metric elements, then the max number of possible metrics to be computed for the custom tag would be (5)*(3)=15. If the preconfigured cardinality threshold value is 12, then at least one of the parameter value set or the parameter metric set would need to decrease by at least one set element. In certain implementations, the preconfigured cardinality threshold value is based at least in part on the resources allocated to the customer.

The cardinality of a tag may be based on one of the parameter value set included in the tag or the parameter metric set included in the tag. For example, the preconfigured cardinality threshold value of a tag value set may be 4 value elements. If the tag includes more than 4 value elements, then the cardinality of the value set included in the tag would be too high and would need to be reduced to be at most 4 value elements. Additionally, or alternatively, a similar analysis may be performed relating to the parameter metric set, with the same or a different preconfigured cardinality threshold value.

At 1304, based on the determination at 1302, if the cardinality is greater than the preconfigured cardinality threshold value, then 1306 may be performed. If the cardinality is not greater than the preconfigured cardinality threshold value, then 1308 may be performed.

At 1306, an indication that the custom tag is not supported based on the preconfigured cardinality threshold is transmitted.

At 1308, an indication that the custom tag is supported based on the preconfigured cardinality threshold is transmitted.

Figure 14:
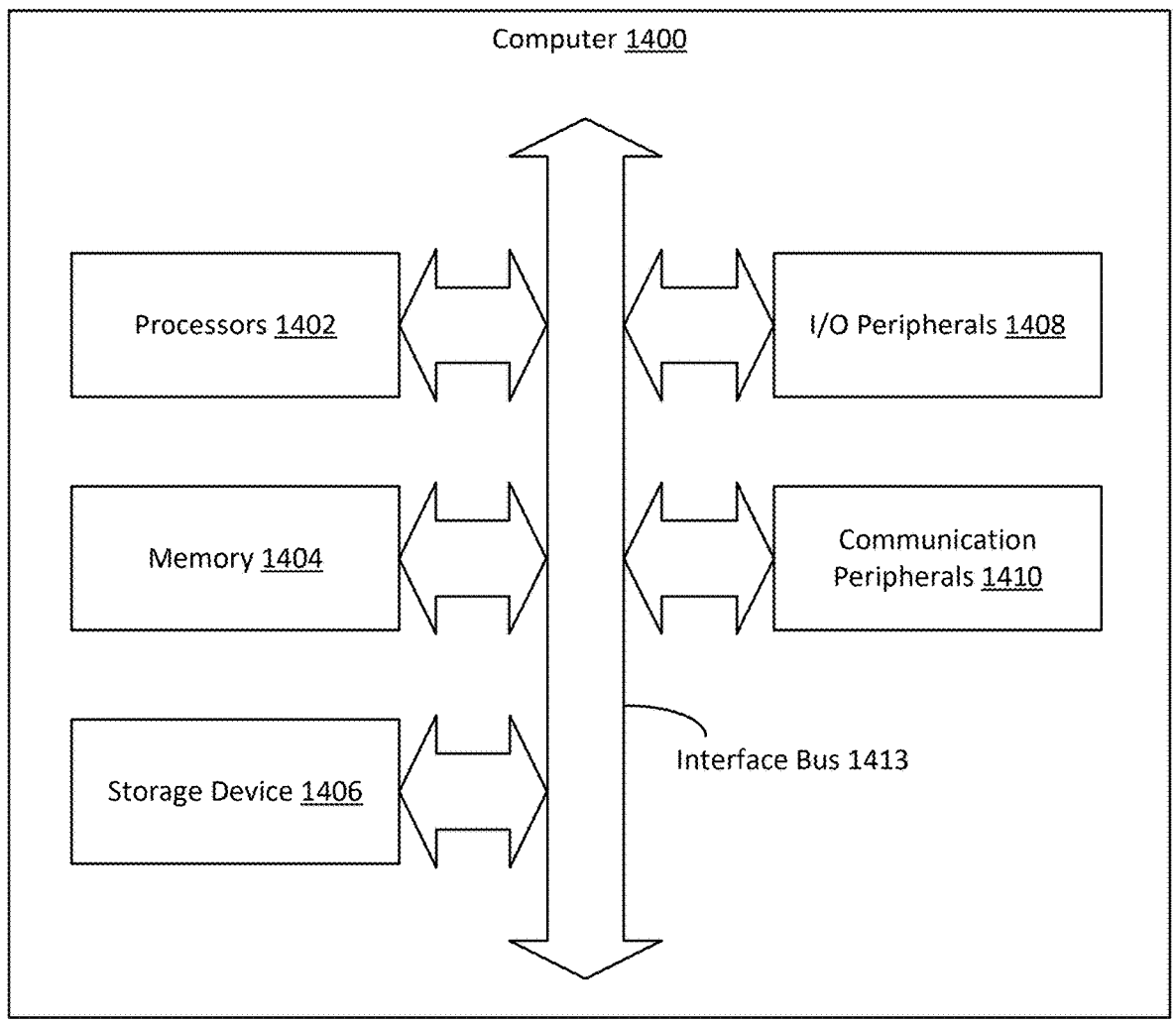
FIG. 14 illustrates an example of an architecture of a computer.

FIG. 14 illustrates an example of an architecture of a computer 1400.

The computer 1400 includes at least processors 1402, a memory 1404, a storage device 1406, input/output peripherals (I/O) 1408, communication peripherals 1410, and an interface bus 1412. The interface bus 1412 is configured to communicate, transmit, and transfer data, controls, and commands among the various components of the computer 1400. The memory 1404 and the storage device 1406 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1404 and the storage device 1406 also include computer readable signal media. A computer readable signal medium includes a propagated data signal with computer readable program code embodied therein. Such a propagated signal takes any of a variety of forms including, but not limited to, electric, optical, or any combination thereof. A computer readable signal medium includes any computer readable medium that is not a computer readable storage medium and that can communicate, propagate, or transport a program for use in connection with the computer 1400.

Further, the memory 1404 includes an operating system, programs, and applications. The processors 1402 can include a controller. At least one of the processors 1402 is configured to execute the stored instructions and includes, for example, a logical processing unit, a microprocessor, a digital signal processor, and other processors. The I/O peripherals 1408 include user interfaces, such as a keyboard, screen (e.g., an electrophoretic panel with a panel controller), microphone, speaker, other input/output devices, and computing components, such as graphical processing units, serial ports, parallel ports, universal serial buses, and other input/output peripherals. The I/O peripherals 1408 are connected to the processor 1402 through any of the ports coupled to the interface bus 1412. The communication peripherals 1410 are configured to facilitate communication between the computer 1400 and other computers over a communication network and include, for example, a network interface controller, modem, wireless and wired interface cards, antenna, and other communication peripherals.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    receiving tag information identifying a custom tag to be created for user interaction data for a customer, the user interaction data for the customer comprising data relating to one or more user interactions with a web application, a mobile application, or a website, the user interaction data comprising a set of one or more keys and a set of one or more values corresponding to the set of one or more keys, wherein the tag information identifies a set of parameters for the custom tag, the set of parameters including:
        a parameter key identifying a first key from the set of one or more keys,
        a parameter value set of one or more values for the first key, and
        a parameter metric set of one or more metrics for the custom tag;
    receiving an indication that the custom tag is to be indexed;
    performing processing to determine whether the custom tag can be indexed, wherein the processing comprises determining whether resources associated with the customer are sufficient to perform processing for computing the one or more metrics in the parameter metric set for the one or more values for the first key; and
    upon determining that the custom tag can be indexed, creating the custom tag for the customer, wherein the custom tag is a custom indexed tag.

2. The method of claim 1, wherein the determining whether the resources associated with the customer are sufficient to perform the processing indexed comprises:
    determining a cardinality value based on a number of values in the parameter value set and a number of metrics in the parameter metric set;
    determining a predetermined cardinality threshold value;
    comparing the cardinality value with the predetermined cardinality threshold value;
    upon determining, based on the comparing, that the cardinality value exceeds the predetermined cardinality threshold value, outputting information indicating that the custom tag cannot be indexed; and
    upon determining, based on the comparing, that the cardinality value does not exceed the predetermined cardinality threshold value, outputting information indicating that the custom tag can be indexed.

3. The method of claim 2, wherein upon determining that the cardinality value exceeds the predetermined cardinality threshold value, the method further comprises at least one of: (i) increasing the resources associated with the customer, (ii) adjusting the parameter value set, or (iii) adjusting the parameter metric set.

4. The method of claim 2, wherein determining whether the resources associated with the customer are sufficient to perform the processing comprises:
    identifying the resources associated with the customer;
    identifying, from the resources associated with the customer, resources available to the customer;
    determining the resources to process the parameter value set and the parameter metric set;
    comparing (i) the resources to process the parameter value set and the parameter metric set with the (ii) resources available to the customer;
    upon determining, based on the comparing, that the resources to process the parameter value set and the parameter metric set exceeds the resources available to the customer, outputting information indicating that the custom tag cannot be indexed; and
    upon determining, based on the comparing, that the resources to process the parameter value set and the parameter metric set does not exceed the resources available to the customer, outputting information indicating that the custom tag can be indexed.

5. The method of claim 4, wherein upon determining that the resources to process the parameter value set and the parameter metric set exceeds the resources available to the customer, the method further comprises:
    performing processing such that the resources available to the customer are great enough to index the custom tag, the processing comprising: increasing the resources associated with the customer.

6. The method of claim 4, wherein upon determining that the resources to process the parameter value set and the parameter metric set exceeds the resources available to the customer, the method further comprises:
    performing processing such that the resources available to the customer are great enough to index the custom tag, the processing comprising:
    adjusting the set of parameters.

7. The method of claim 6, wherein adjusting the set of parameters comprises at least one of:
reducing a number of values in the parameter value set; or
changing the values included in the parameter value set.

8. The method of claim 6, wherein adjusting the set of parameters comprises at least one of:
reducing a number of metrics in the parameter metric set; or
changing the metrics included in the parameter metric set.

9. The method of claim 1, further comprising:
receiving the user interaction data;
determining analytics for the user interaction data, the determination comprising:
determining a set of values in common between (i) the parameter value set and (ii) the set of one or more values corresponding to the parameter key in the set of one or more keys; and
computing each metric in the parameter metric set based at least on each value in the set of values in common to include in the analytics; and
presenting the analytics.

10. A system comprising:
a processor; and
a computer readable non-transitory storage medium storing instructions that, when executed by the processor, cause the processor to:
receive tag information identifying a custom tag to be created for user interaction data for a customer, the user interaction data for the customer comprising data relating to one or more user interactions with a web application, mobile application, or website, the user interaction data comprising a set of one or more keys and a set of one or more values corresponding to the set of one or more keys, wherein the tag information identifies a set of parameters for the custom tag, the set of parameters including:
a parameter key identifying a first key from the set of one or more keys,
a parameter value set of one or more values for the first key, and
a parameter metric set of one or more metrics for the custom tag;
receive an indication that the custom tag is to be indexed;
perform processing to determine whether the custom tag can be indexed, wherein the processing comprises determining whether resources associated with the customer are sufficient to perform processing for computing the one or more metrics in the parameter metric set for the one or more values for the first key; and
upon determining that the custom tag can be indexed, create the custom tag for the customer, wherein the custom tag is a custom indexed tag.

11. The system of claim 10, wherein performing the processing to determine whether the custom tag can be indexed further causes the processor to:
identify the resources associated with the customer;
identify, from the resources associated with the customer, resources available to the customer;
determine the resources to process the parameter value set and the parameter metric set;
compare (i) the resources to process the parameter value set and the parameter metric set with the (ii) resources available to the customer;
upon determining, based on the comparing, that the resources to process the parameter value set and the parameter metric set exceeds the resources available to the customer, outputting information indicating that the custom tag cannot be indexed; and
upon determining, based on the comparing, that the resources to process the parameter value set and the parameter metric set does not exceed the resources available to the customer, outputting information indicating that the custom tag can be indexed.

12. The system of claim 11, wherein upon determining that the resources to process the parameter value set and the parameter metric set exceeds the resources available to the customer, the instructions further cause the processor to:
perform processing such that the resources available to the customer are great enough to index the custom tag, the processing comprising at least one of:
increase the resources associated with the customer; or
adjust the set of parameters.

13. The system of claim 10, wherein the instructions further cause the processor to:
receive the user interaction data;
determine analytics for the user interaction data, the determination comprising:
determining a set of values in common between (i) the parameter value set and (ii) the set of one or more values corresponding to the parameter key in the set of one or more keys; and
computing each metric in the parameter metric set for each value in the set of values in common; and
presenting the analytics.

14. A computer readable non-transitory storage medium storing instructions for processing data generated by instrumented software, the instructions when executed by a processor cause the processor to perform a process comprising:
receiving tag information identifying a custom tag to be created for user interaction data for a customer, the user interaction data for the customer comprising data relating to one or more user interactions with a web application, mobile application, or website, the user interaction data comprising a set of one or more keys and a set of one or more values corresponding to the set of one or more keys, wherein the tag information identifies a set of parameters for the custom tag, the set of parameters including:
a parameter key identifying a first key from the set of one or more keys,
a parameter value set of one or more values for the first key, and
a parameter metric set of one or more metrics for the custom tag;
receiving an indication that the custom tag is to be indexed;
performing processing to determine whether the custom tag can be indexed, wherein the processing comprises determining whether resources associated with the customer are sufficient to perform processing for computing the one or more metrics in the parameter metric set for the one or more values for the first key; and
upon determining that the custom tag can be indexed, creating the custom tag for the customer, wherein the custom tag is a custom indexed tag.

15. The computer readable non-transitory storage medium of claim 14, wherein determining whether the resources associated with the customer are sufficient to perform the processing comprises:
identifying the resources associated with the customer;
identifying, from the resources associated with the customer, resources available to the customer;

determining the resources to process the parameter value set and the parameter metric set;

comparing (i) the resources to process the parameter value set and the parameter metric set with the (ii) resources available to the customer;

upon determining, based on the comparing, that the resources to process the parameter value set and the parameter metric set exceeds the resources available to the customer, outputting information indicating that the custom tag cannot be indexed; and upon determining, based on the comparing, that the resources to process the parameter value set and the parameter metric set does not exceed the resources available to the customer, outputting information indicating that the custom tag can be indexed.

16. The computer readable non-transitory storage medium of claim 15, wherein upon determining that the resources to process the parameter value set and the parameter metric set exceeds the resources available to the customer, the instructions further cause the processor to:

perform processing such that the resources available to the customer are great enough to index the custom tag, the processing comprising:

increase the resources associated with the customer; or adjust the set of parameters.

17. The computer readable non-transitory storage medium of claim 14, further comprising:

receiving the user interaction data;

determining analytics for the user interaction data, the determination comprising:

determining a set of values in common between (i) the parameter value set and (ii) the set of one or more values corresponding to the parameter key in the set of one or more keys; and computing each metric in the parameter metric set for each value in the set of values in common; and presenting the analytics.

* * * * *